Dec. 30, 1952     E. KAMPEL     2,623,289
GUIDELINE SUPPORTING APPARATUS FOR BRICKLAYING
Filed July 18, 1949     9 Sheets-Sheet 1
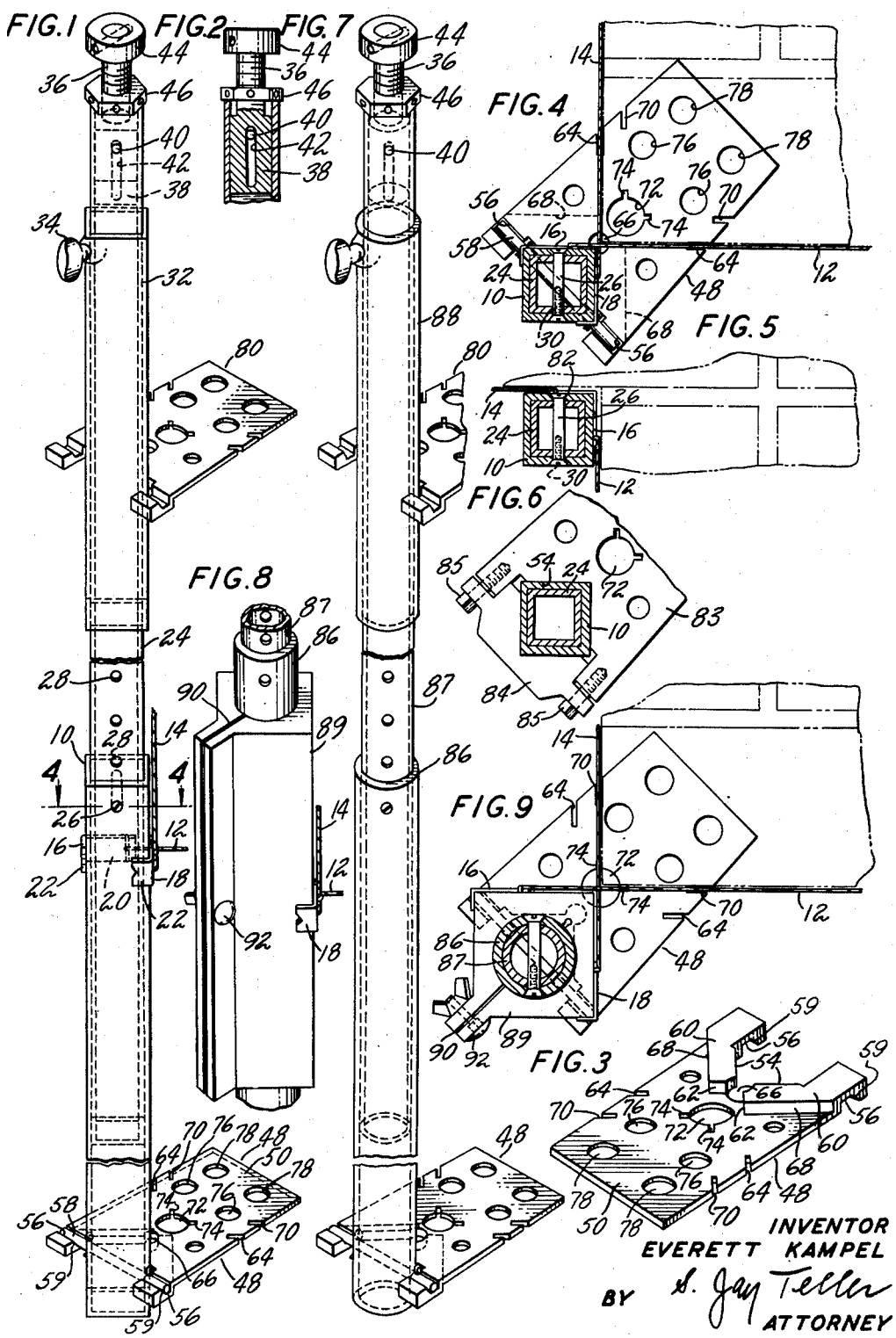
INVENTOR
EVERETT KAMPEL
BY S. Jay Teller
ATTORNEY Dec. 30, 1952  E. KAMPEL  2,623,289
GUIDELINE SUPPORTING APPARATUS FOR BRICKLAYING
Filed July 18, 1949  9 Sheets-Sheet 2

INVENTOR
EVERETT KAMPEL
BY S. Jay Teller
ATTORNEY

Dec. 30, 1952  E. KAMPEL  2,623,289
GUIDELINE SUPPORTING APPARATUS FOR BRICKLAYING
Filed July 18, 1949  9 Sheets-Sheet 3
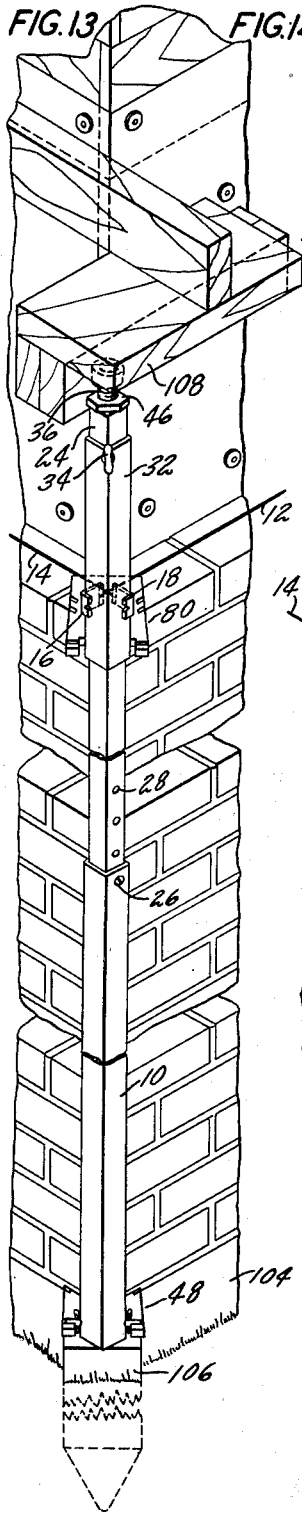
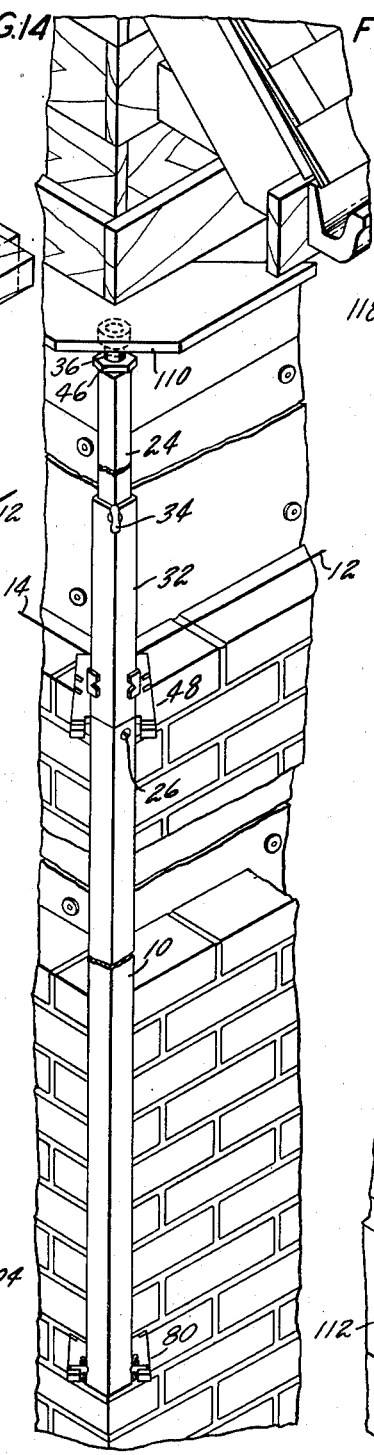
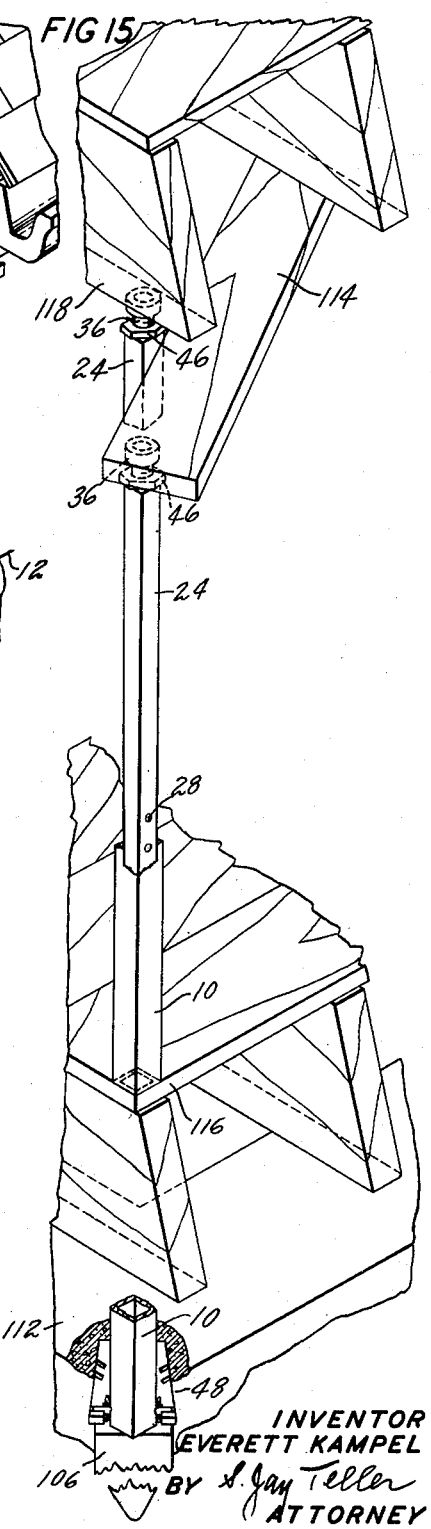
INVENTOR
EVERETT KAMPEL
BY S. Jay Teller
ATTORNEY

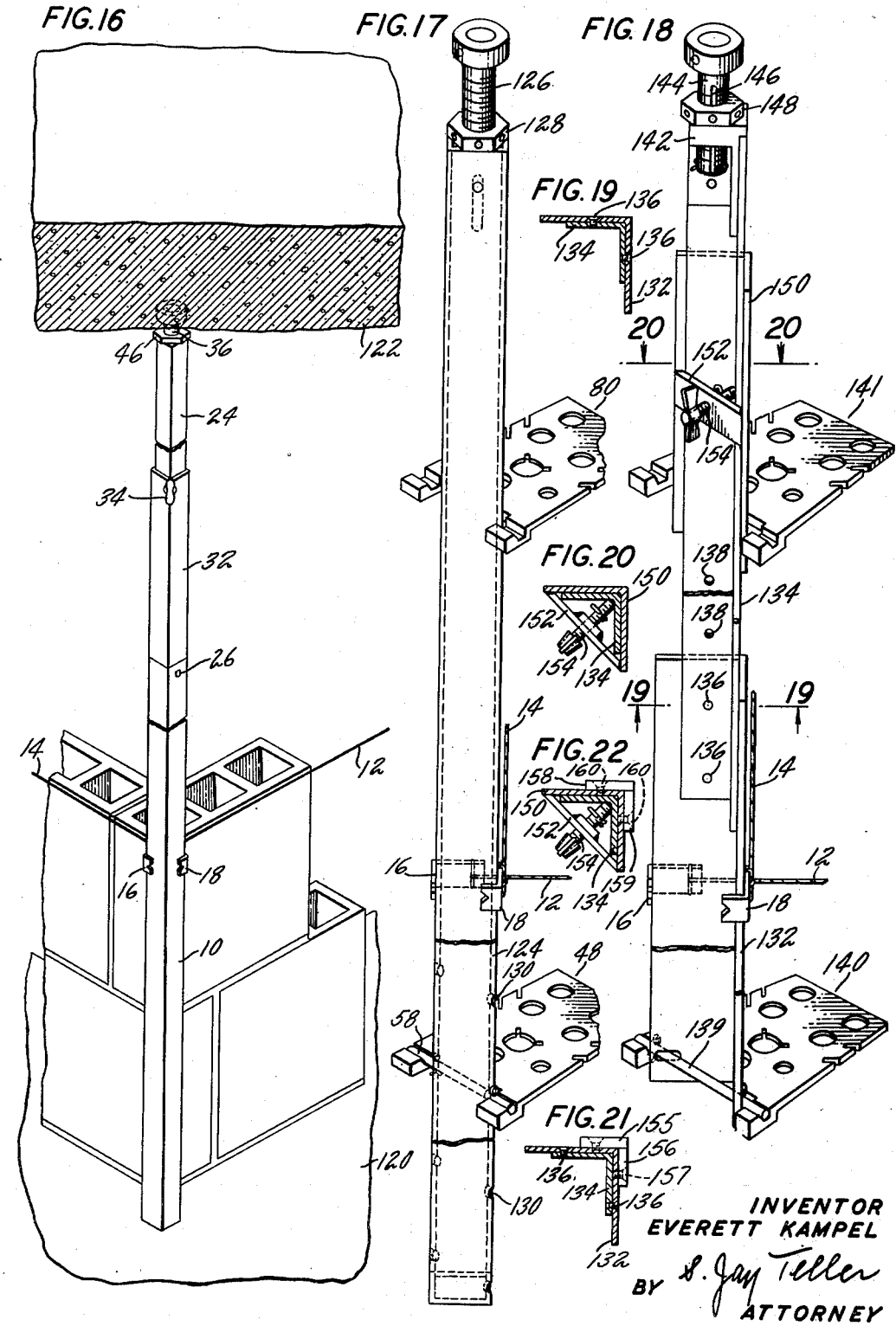

Dec. 30, 1952   E. KAMPEL   2,623,289
GUIDELINE SUPPORTING APPARATUS FOR BRICKLAYING
Filed July 18, 1949   9 Sheets-Sheet 5
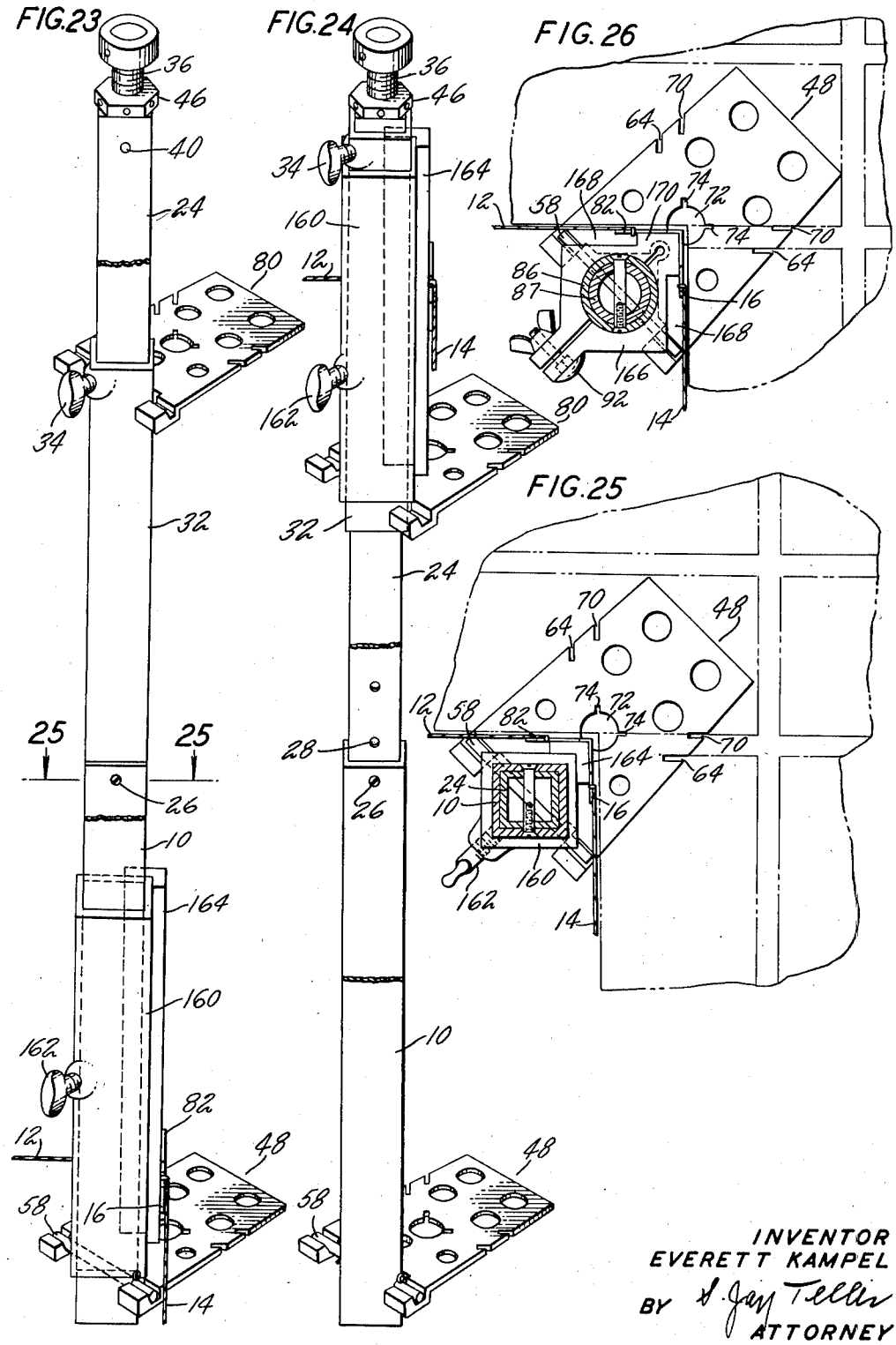
INVENTOR
EVERETT KAMPEL
BY *S. Jay Teller*
ATTORNEY

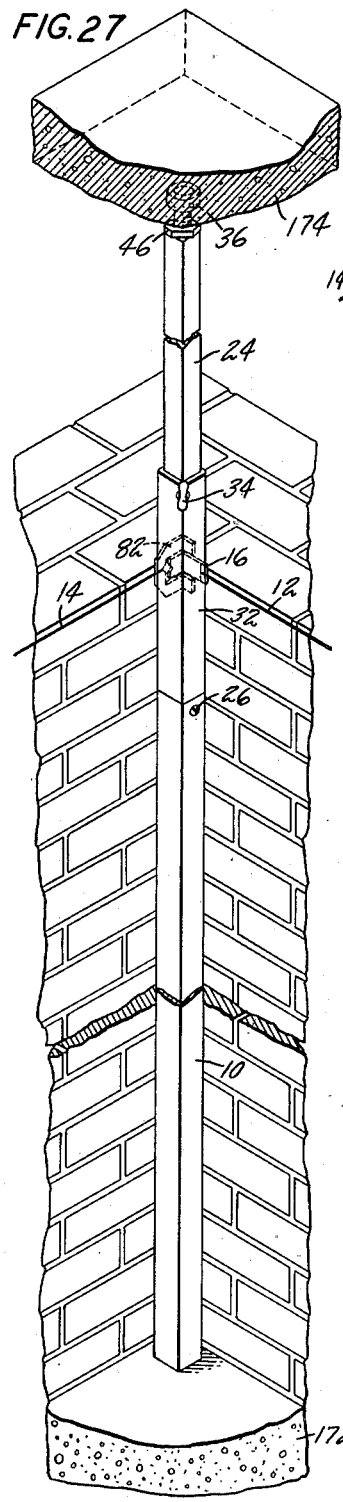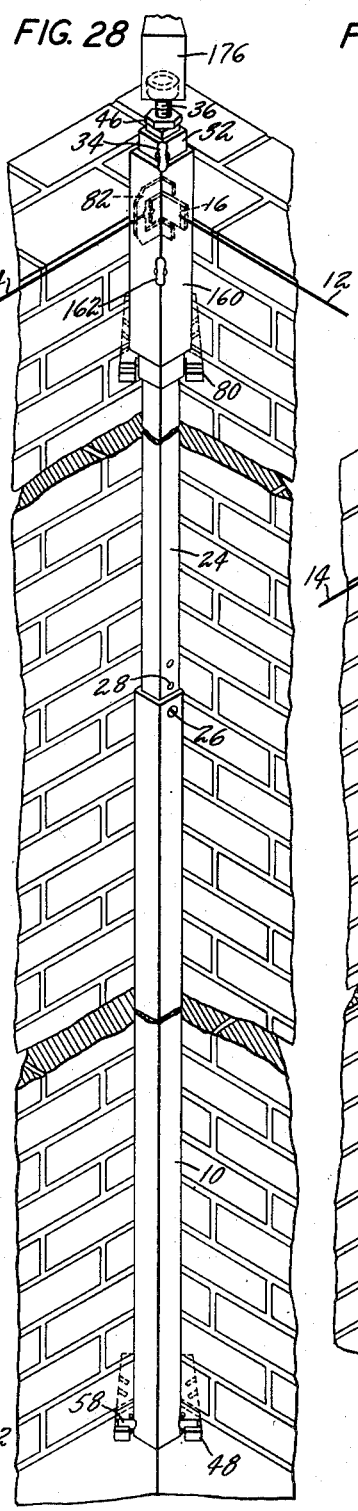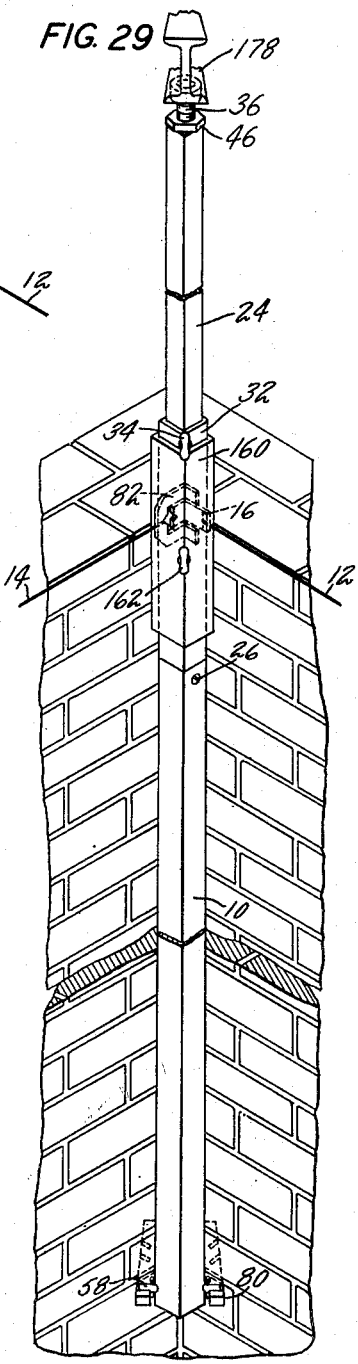

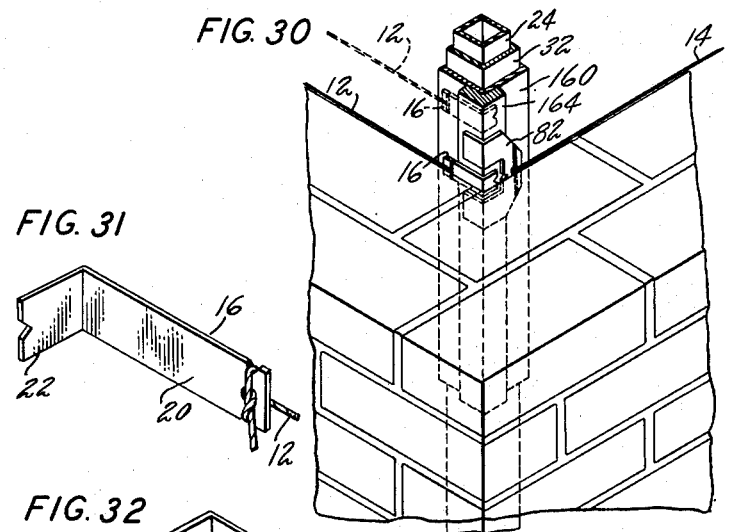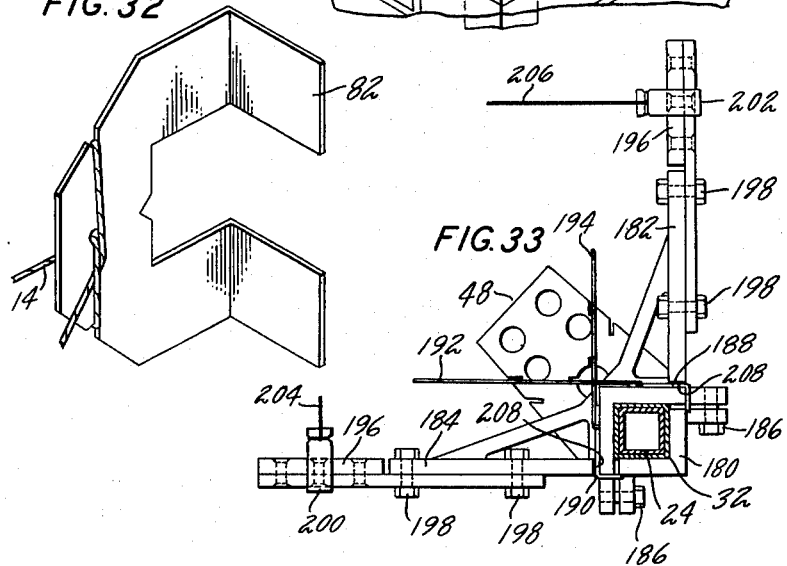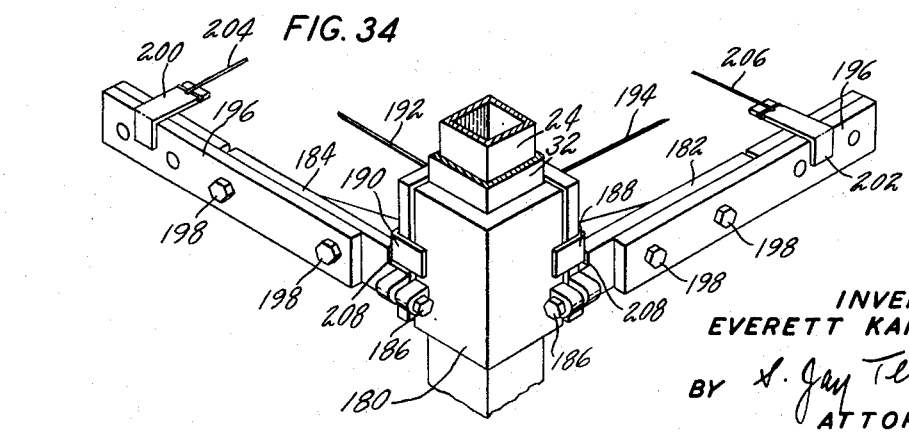

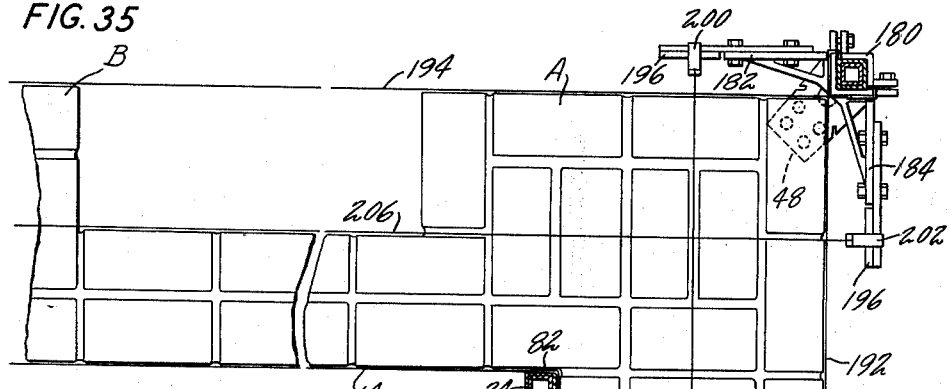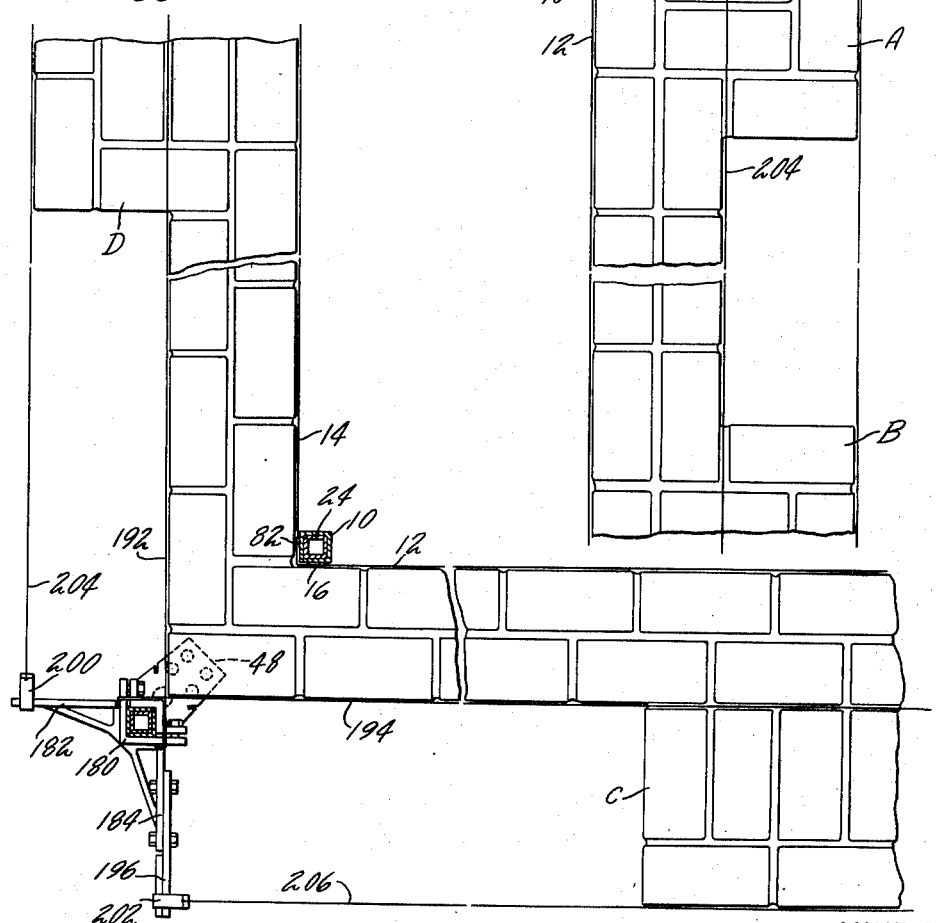

Dec. 30, 1952            E. KAMPEL            2,623,289

GUIDELINE SUPPORTING APPARATUS FOR BRICKLAYING

Filed July 18, 1949            9 Sheets-Sheet 9

INVENTOR
EVERETT KAMPEL
BY S. Jay Teller
ATTORNEY

UNITED STATES PATENT OFFICE 2,623,289

GUIDELINE SUPPORTING APPARATUS FOR BRICKLAYING

Everett Kampel, Hartford, Conn.

Application July 18, 1949, Serial No. 105,414

30 Claims. (Cl. 33—85)

The invention relates to an apparatus for supporting the guide lines for use in the laying of building or other walls comprising masonry units.

The apparatus is suitable for use in the laying of any masonry block units, such as brick, stone, cast stone, concrete or cinder-concrete blocks, glass blocks, hollow tile, and glazed facing tile. While the apparatus is adapted for use with various types of masonry units, it is particularly adapted for brick, and for convenience and brevity of expression the term "brick" will be herein used in a generic sense. This term is to be understood as including any or all masonry block units such as those above-mentioned.

The usual custom or practice in the construction of a building or other structure formed of separate masonry units such as brick is to lay up what are known as "leads" at exterior and interior corners and sometimes at intermediate positions between corners. These leads serve to support mason's lines or chalk lines, hereafter referred to as "guide lines," which are used for guiding the laying of the courses of brick between the leads and up to the level of the tops thereof. Then additional leads are built and the procedure is repeated. These leads are laid up or built by skillful leveling, plumbing and straight-edging or "ranging." The construction of the before-mentioned leads is costly, particularly as a very considerable degree of care is required and as the work can therefore be done only by workmen having more than the usual degree of skill. Furthermore, the construction of the leads frequently results in delay as the laying of the brick between the leads must be deferred until the leads are sufficiently advanced. In many instances the less skilled masons must be idle or transferred to other work while waiting for the leads to be built.

In accordance with the invention, an apparatus is provided having an upright structure which can be placed at each corner of a wall for supporting the guide lines, thus avoiding the necessity for any corner masonry leads such as above-referred to. This apparatus not only avoids the cost incidental to laying up the corner leads, but it also makes it possible for the brick to be laid at any part of the wall without the delays incidental to the prior construction of leads. All parts of the wall can be laid up at the same time, and this can be done without any necessity for the specially skilled masons that are required for the conventional leads. All straight work can be done by masons having only a minimum degree of skill.

One of the objects of the invention is to provide an apparatus having an upright guide line holding structure and having means for applying vertical pressure to clamp the upright structure in fixed position between a lower fixed support and an upper fixed support. The fixed supports referred to may be permanent parts of the building, such as two concrete floors, or they may be separate supports specially provided to hold the upright structure.

Another object of the invention is to provide an upright structure which is readily adjustable in length, this provision for lengthwise adjustment cooperating with the means for applying vertical pressure so that the upright structure can be clamped between fixed supports that are variously spaced from each other.

Another object of the invention is to provide a supporting plate adapted to project from the wall and constructed to serve as the lower fixed support for the upright structure, the said plate preferably having means thereon for facilitating the proper positioning of the plate with respect to the wall.

Still another object of the invention is to provide two separate supporting plates adapted to project from the wall, the said plates being constructed to serve as two separate lower fixed supports for the upright structure which can be supported successively on the two plates and at different elevations.

Still another object of the invention is to provide an upright structure comprising telescopically engaging parts and having a sleeve engaging the smaller of the said parts and adapted for supporting guide lines by means of holding clips or otherwise.

Still another object of the invention is to provide an upright structure comprising telescopically engaging parts and having a sleeve engaging the smaller of the said parts and having a second sleeve engageable either with the larger of the said parts or with the first said sleeve, the second said sleeve being adapted for supporting guide lines by means of holding clips or otherwise.

Still further objects of the invention will be apparent from the drawings and from the following specification and claims.

The drawings show several embodiments of the invention, but it will be understood that various changes may be made from the constructions shown and that the drawings are not to be construed as defining or limiting the scope of the invention, the claims forming a part of this 2,623,289

3 specification being relied upon for that purpose.
Of the drawings:

Fig. 1 is a perspective view of an apparatus embodying the invention.

Fig. 2 is a fragmentary central vertical sectional view of the upper part of the apparatus as shown in Fig. 1.

Fig. 3 is an enlarged perspective view showing the bottom of the supporting plate constituting a part of the apparatus.

Fig. 4 is an enlarged horizontal sectional view taken along the line 4—4 of Fig. 1, this view showing in phantom an exterior corner of a brick wall laid by use of the apparatus.

Fig. 5 is a view similar to Fig. 4, but showing in phantom an interior corner of a brick wall laid by use of the apparatus.

Fig. 6 is a fragmentary view similar to Fig. 4, but showing an alternative supporting plate.

Fig. 7 is a view similar to Fig. 1, but showing an alternative embodiment of the invention.

Fig. 8 is a perspective view showing a sleeve adapted for use in conjunction with the apparatus as shown in Fig. 7.

Fig. 9 is a view similar to Fig. 4, but showing an apparatus as illustrated in Figs. 7 and 8.

Fig. 13 is a view similar to Fig. 11, but showing the apparatus as illustrated in Figs. 1 to 4 in use for laying the wall of a brick veneer building, a portion of the wall having been completed.

Fig. 14 is a view similar to Fig. 13, but showing the apparatus shifted to a higher position and showing an additional portion of the wall completed.

Fig. 15 is a view similar to Fig. 11, but showing one apparatus as illustrated in Figs. 1 to 4 in place for use in conjunction with a brick wall having an exterior corner and showing parts of a similar apparatus also in place for use in conjunction with the interior corner of the same wall.

Fig. 16 is a perspective view similar to Fig. 11, but showing the apparatus as illustrated in Figs. 1 to 4 in use for laying a partition wall between two floors of a building.

Fig. 17 is a view similar to Fig. 1, but showing an alternative embodiment of the invention.

Fig. 18 is a view similar to Fig. 1, but showing another alternative embodiment of the invention.

Fig. 19 is a horizontal sectional view taken along the line 19—19 of Fig. 18.

Fig. 20 is a horizontal sectional view taken along the line 20—20 of Fig. 18.

Fig. 21 is a view similar to Fig. 19, but showing optionally useable additional parts.

Fig. 22 is a view similar to Fig. 20, but showing optionally useable additional parts.

Fig. 23 is a view showing the same apparatus as that illustrated in Figs. 1 to 4, but with an additional sleeve particularly adapting the apparatus for use at an interior corner of a wall.

Fig. 24 is a view similar to Fig. 23, but showing the several parts of the apparatus in different relative positions.

Fig. 25 is an enlarged horizontal sectional view

Figure 10:
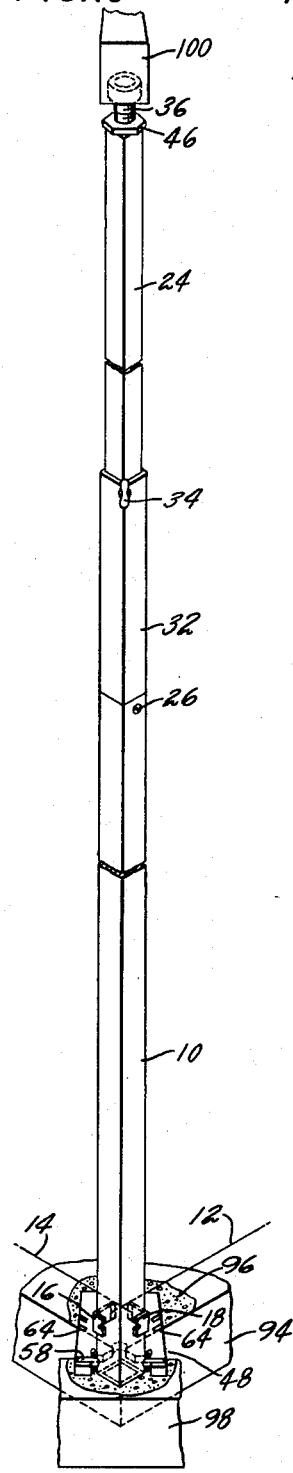
Fig. 10 is a perspective view showing the apparatus as illustrated in Figs. 1 to 4 in place for use in conjunction with a brick wall having an exterior corner.

4 taken along the line 25, 25 of Fig. 23, this view showing in phantom an interior corner of a brick wall laid by use of the apparatus.

Fig. 26 is a view similar to Figs. 25, but showing an alternative sleeve which may be provided when the apparatus as shown in Fig. 7 is to be used for an interior wall corner.

Fig. 27 is a perspective view showing the apparatus as illustrated in Figs. 1 to 3 and 5 in use at an interior corner of a wall with a portion of the wall completed.

Fig. 28 is a perspective view showing the apparatus as illustrated in Figs. 23 to 25 in use at an interior corner of a brick wall with a portion of the wall completed.

Fig. 29 is a view similar to Fig. 28, but showing the apparatus shifted to a higher elevation and with an additional portion of the wall completed.

Fig. 30 is an enlarged perspective view similar to a portion of Fig. 28 but looking in the opposite direction, this view more clearly showing the line clips and their manner of use.

Figs. 31 and 32 are enlarged perspective views showing the manner of attachment of the guide lines to the respective holding clips.

Fig. 33 is a plan view partly in section showing an additional sleeve and associated parts for use with the apparatus as shown in Figs. 1 to 4, this additional sleeve particularly adapting the apparatus for use in conjunction with a brick wall having pilasters.

Fig. 34 is a perspective view of the parts shown in Fig. 33.

Figs. 35 to 38 are plan views showing various manners of use for the apparatus as shown in Figs. 33 and 34.

The several embodiments of the invention as shown in the drawings and representative procedures for using the said embodiments of the invention are herein described in detail under appropriate headings.

*Apparatus as shown in Figs. 1 to 5*

A member or element 10 is provided which is adapted to be located in upright position adjacent a corner of the wall to be laid. The member 10 serves to support two guide lines, such as 12 and 14, at right angles to each other for the laying of the brick along two faces of the wall at opposite sides of a corner thereof. The guide lines are shiftable vertically upward along the member 10 for the laying of successive courses of brick. Ordinarily the line supporting member or element, such as the member 10, has at least one vertical corner with vertical faces at right angles to each other. As shown, the member 10 is rectangular and preferably square, thus having four vertical corners. When the line supporting member or element has one or more vertical corners, the member is located with two adjacent vertical faces thereof in parallelism with the faces of the wall to be laid and at opposite sides of the corner thereof as shown for instance in Fig. 4. The faces of the member are preferably spaced outward at least to a small extent.

The guide lines 12 and 14 may be variously supported by the upright member, as for instance by wrapping them around the member or by attaching them to pins or pegs projecting from the member in vertically spaced relationship. Preferably, however, the lines 12 and 14 are held by L-shaped clips 16 and 18, each clip having a leg 20 to which the line is attached and a leg 22 at right angles to the leg 20 and engaging one face of the upright supporting member. Each lines engages the leg 20 of the corresponding clip at the outer face thereof, the line being suitably fastened, as for instance in the manner illustrated in Figs. 31 and 32. The opposite end of each line is connected with a similar clip, not shown, which last said clip engages a suitable vertical supporting element which may be similar to the member 10. The line is tightened and the two clips, by reason of the frictional engagement of their legs 22 with the vertical faces of the supporting members, serve to hold the line in fixed horipontal position. The member 10 is so spaced from the wall faces that the lines 12 and 14 are spaced from the wall faces by a distance about equal to the thickness of the line as is conventional. The clips can be shifted upward from time to time as necessary for the laying of successive courses of brick. Lines can be marked on the upright member by crayon, pencil or otherwise to indicate the spacing for the successive courses.

It is ordinarily necessary, or at least desirable, for the apparatus to be vertically adjustable as to its overall length. Preferably the member 10 is tubular, and a second member 24 is provided which telescopically fits within the member 10. The member 24 may also be tubular to reduce weight. Each of the members 10 and 24 extends at one end vertically beyond the corresponding end of the other member. Specifically, the upper end portion of the inner member 24 extends vertically upward beyond the upper end of the outer member 10 and the lower end portion of the outer member 10 extends vertically downward beyond the lower end of the inner member 24. The members 10 and 24 are relatively adjustable vertically to change the overall length and means is provided for connecting them in any one of a plurality of positions of relative vertical adjustment. As shown in Figs. 1 and 4, the member 10 has aligned horizontal holes therein for a horizontal pin 26. The pin 26 passes through any one of a series of pairs of horizontal holes 28, 28 in the member 24. By placing the pin 26 in different holes 28, 28 the two members 10 and 24 can be connected in different positions. The pin 26 has a head at one end fitting a countersink in the member 10. The pin is held in place by a screw 30 at its opposite end, this screw having a head fitting a countersink in the member 10. It will be seen that no portion of the pin 26 or of its holding screw 30 projects beyond the faces of the member 10.

Another member is provided constituting a sleeve 32 which fits the inner member 24 and which is vertically adjustable thereon. The sleeve 32 has the same size and shape as the outer member 10 and the corners and faces of the sleeve align with those of the said outer member. The sleeve 32 can be secured in adjusted position on the inner member 24 by means of a thumb screw 34, preferably near the top thereof. As shown in Fig. 1, the sleeve 32 is spaced upward from the outer member 10, but it may be lowered so that the bottom of the sleeve engages the top of the member. The sleeve is adapted to also serve as a line supporting member or element, and when the sleeve is in the last said position, the line clips can be shifted upward from the member 10 to the sleeve 32. When the clips have been shifted upward to the extent permitted by the length of the sleeve, the sleeve can be raised on the member 24 and the clips can be moved to new positions on the sleeve.

The term "upright structure" is herein used generically to designate the line holding member or members, and this structure may be only a single member, such as 10, or a plurality of members such as 10, 24 and 32.

The line supporting upright structure, whether comprising three parts such as 10, 24 and 32 or comprising only a single part as hereinafter described in connection with Fig. 17, is preferably held in place by means which applies endwise pressure to effect clamping between a lower fixed support and an upper fixed support. This clamping means may be widely varied, but it is shown as comprising a screw 36 connected with the inner or upper member 24. The details of construction and operation may be varied but the screw is shown as non-rotatable, having an integral head 38 at the bottom which fits within the upper portion of the member 24. A pin 40 extends through holes in the wall of the member 24 and through a vertical slot 42 in the head 38, this pin limiting relative movement of the head. At the upper end of the screw is a head 44 for engaging an upper fixed support and for providing increased bearing area. A nut 46 has threaded engagement with the screw 36 and the bottom of the nut engages the top of the member 24.

When the bottom portion of the member 10 is engaged with a lower fixed support and the head 44 is adjacent an upper fixed support, the nut 46 can be turned to move the screw 36 upward so as to force the head 44 against the upper fixed support. Thus the line holding means is clamped in position. The effective length of the screw 36 is greater than the spacing between two adjacent pairs of holes 28, 28. Thus by placing the pin 26 in the proper holes 28, 28 and by adjusting the screw, the apparatus may have clamping engagement with lower and upper fixed supports spaced apart by any distance within the range of the apparatus.

When the apparatus is being used for an interior corner at the inside of a wall as indicated in Fig. 5, the bottom fixed support may be a concrete foundation or floor and in such case no special bottom supporting means is necessary. However, for an exterior corner at the outside of a wall a bottom fixed support is provided, this preferably being a plate 48. The plate 48 has an inner portion 50 which is of such thickness that it can be located in the mortar space between the foundation and the lowermost course of brick in the wall or between two immediately adjacent courses. The plate 48 also has a projecting portion which is adapted to support the lower portion of the upright structure, such as the lower portion of the member 10. Preferably the plate 48 serves not only to support the member 10 but also to properly locate or position it with respect to the corner of the wall.

The projecting portion of the plate 48 has vertical faces 54, 54 for engaging the faces of the member 10 and preferably these vertical faces are the faces of a notch formed in the plate. The notch is open at the front, that is, in the direction away from the inner portion 50 of the plate and it extends vertically through the projecting portion of the plate. The faces 54, 54 are at right angles to each other and they are at angles of 45° to the longitudinal lines of the plate. Thus when the plate is positioned as shown in Fig. 4, it serves to position the member 10 with two of its faces parallel with but slightly spaced from the planes of the wall faces at opposite sides of the corner.

In order that the plate 48 may support the member 10, it is provided with two aligned horizontal grooves 56, 56 at opposite sides of the notch. A horizontal pin 58 is secured to the member 10, this pin being so located that it can enter grooves 56, 56. As shown, the pin 58 extends through holes in the corners of the member 10, being held in place by cotter pins. Preferably the grooves 56, 56 have inclined front faces 59, 59 which engage the pin 58 to cam it rearward. Thus the faces 59, 59 cooperate with the pin 58 to hold the member 10 in firm engagement with the faces 54, 54 of the notch in the plate.

In order to facilitate the positioning of the plate 48 with respect to the wall, the plate is formed at its bottom with two ribs 60, 60. The ribs 60, 60 have two vertical faces 62, 62 for engaging a previously laid portion of the wall at an exterior corner thereof as shown in Fig. 4. When the faces 62, 62 are in engagement with the wall faces, the plate is so located that it positions the upright member 10 as shown.

Cooperating with the rib faces 62, 62 are suitable markings on the plate. These markings are preferably slots 64, 64 formed in the plate at the sides thereof. The inner edges of the notches can be placed in register with the wall faces as shown in Fig. 4 to more accurately locate the plate. A trowel or other tool may be inserted in the slots to assist registering the inner edges of the slots with the wall faces. A sight hole 66 is preferably provided so that the user can look downward and observe the corner of the wall below the plate.

The ribs 60, 60 also have two vertical faces 68, 68 for engaging a previously laid portion of the wall at an interior corner thereof. When the faces 68, 68 are in engagement with the wall faces, the plate is so located that it positions the upright member in relatively widely spaced relationship with the wall faces for a reason that will be hereinafter explained.

Cooperating with the rib faces 68, 68 are suitable markings on the plate. These markings are preferably slots 70, 70 formed in the plate at the sides thereof and similar to the slots 64, 64. The inner edges of the slots 70, 70 can be aligned with the wall faces at opposite sides of an interior corner to accurately locate the plate. Preferably the plate has a hole 72 with slots 74, 74 which are in alignment with the respective slots 70, 70. These slots 74, 74 constitute additional markings which can be aligned with the wall faces. The hole 72 serves as a sight hole.

Preferably the plate 48 has holes 76, 76 and 78, 78 additional to the holes 66 and 72. The several holes in the plate are adapted to receive mortar when the plate is imbedded in a wall, the mortar in the holes assisting in holding the plate in place.

A second plate 80 is provided which is or may be identical with the plate 48 as to size and shape and which is also adapted to be placed with its inner portion in the wall between two courses of brick. The purpose of the second plate 80 will be hereinafter explained. It will be observed that the projecting portion of the plate 80, like that of the plate 48, is so shaped as to permit the upright structure to extend past it when the said structure is in its normal upright position. This makes it possible for the plate 80 to be put in place in the wall while the upright structure is in its said normal position.

Fig. 5 is similar to Fig. 4, but shows the apparatus in place adjacent an interior wall corner.

The plate 48 may be omitted as will be more clearly understood from the description covering the manner of use as illustrated in Figs. 5 and 26. The line holding clip 16 may be the same as that shown and described, but in lieu of the clip 18 there is provided a clip 82 which will be more fully described hereinafter.

Apparatus as shown in Fig. 6

Fig. 6 shows an alternate plate 83 which may be substituted for either or both of the plates 48 and 80.

The plate 83 may be substantially like the plate 48 and repetition of the description is unnecessary. A clamping member 84 is provided which may be connected with the plate 83 by bolts 85, 85, extending into threaded holes in the plate. The member 84 is shaped to engage the outer faces of the member 10 or of the sleeve 32. When the bolts 85, 85 are tightened, the member 84 holds the inner faces of the said member 10 or the said sleeve 32 in firm engagement with the faces 54, 54 on the plate 83. When the bolts 85, 85 are loosened or removed, the upright structure can be shifted relatively to the plate 83.

Apparatus as shown in Fig. 7

The apparatus as shown in Fig. 7 is similar to that shown in Figs. 1 to 5 except that the several upright members constituting the line supporting means are circular in cross section instead of square. Upright members 86 and 87 are provided which are similar to the members 10 and 24 and a sleeve 88 is provided which is similar to the sleeve 32. The means for connecting the members 86, 87 and 88 with each other are similar to those already described for the members 10, 24 and 32. The screw means for applying endwise clamping pressure is substantially the same as that shown in Figs. 1 and 2, except that it is adapted for the circular cross section of the member 87. The plates 48 and 80 may be the same as those already described.

The members 86 and 88 are not adapted for engagement with line holding clips such as 16 and 18, but if desired the guide lines may be wrapped around the said members and thus held in the proper positions.

Apparatus as shown in Figs. 8 and 9

While it is possible to wrap the guide lines around the members 86 and 88 which are shown in Fig. 7, it is ordinarily preferable to provide a separate member with which line clips can be engaged. A vertically extending member constituting a sleeve 89 is provided for this purpose, as shown in Figs. 8 and 9.

The sleeve 89 has a cylindrical central opening which fits the upright member 86. A slot 90 extends from the exterior to the central opening, and a screw 92 is provided for drawing together the portions at opposite sides of the slot for clamping the sleeve in place. The sleeve can be clamped to the member 86 or it may be raised and clamped to the sleeve 88. The sleeve is generally square and it has corners at which line clips such as 16 and 18 may be engaged as shown.

When the sleeve 89 is provided, it is necessary for the members 86, 87 and 88 to be more widely spaced from the wall faces, as shown in Fig. 9. In order that the said members and the sleeve 89 may be properly positioned, the slots 70, 70 and 74, 74 in the plate 48 are utilized. The inner edges of the said slots are placed in register with the wall faces at opposite sides of the corner as shown in Fig. 9, and when there is a previously laid portion of the wall the end faces 62, 62 of the ribs 60, 60 are placed against the wall. The size of the sleeve 89 is so related to the positions of the slots that the corners of the sleeve are properly located as shown.

Figure 12:
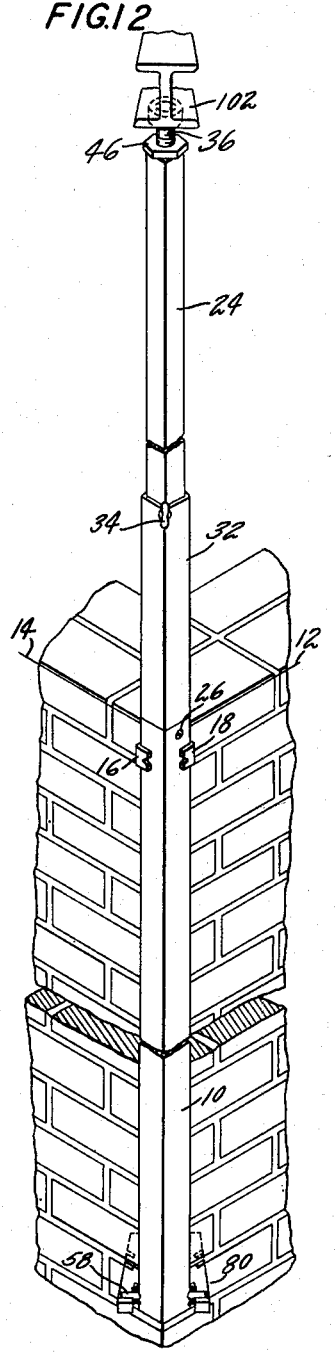
Fig. 12 is a view similar to Fig. 11, but showing the apparatus shifted to a higher position and showing an additional portion of the wall completed.

*Use of apparatus for exterior wall corner as illustrated in Figs. 10 and 12*

Figure 11:
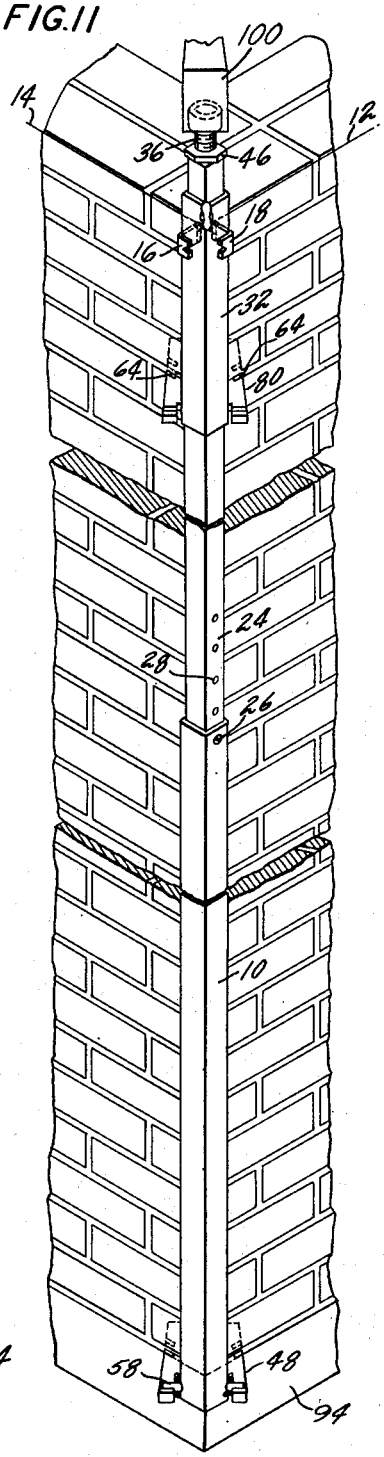
Fig. 11 is a view similar to Fig. 10, but showing a portion of the wall completed.

Figs. 10 to 12 illustrate successive steps in the use of the apparatus as shown in Figs. 1 to 4 for supporting the guide lines at an exterior corner of a brick wall.

The foundation of the building is shown at 94. The plate 48 is placed on the foundation 94, being preferably set in mortar 96. The plate is accurately located with respect to the faces of the wall to be laid, the faces 62, 62 on the ribs 66, 66 and the inner edges of the slots 64, 64 being placed in the planes of the wall faces. Inasmuch as the mortar 96 cannot firmly hold the plate, a temporary support 98 is placed underneath the projecting portion of the plate. This temporary support may be formed of bricks or otherwise and may include mortar at the top.

The upright structure is adjusted in length so as to be adapted to extend from the plate 48 nearly to a temporary fixed upper support 100, such adjustment being effected by placing the pin 26 in suitable holes 28 in the member 24. The upper support 100 is secured to the superstructure of the building, or the said upper support may be carried by a special outrigger structure or framework, not shown. The lower outer member 10 is placed on the plate 48, the pin 58 entering the grooves in the plate. The faces 59, 59 of the grooves 56, 56 engage the pin 58 to cam the member 10 inward so that it is positioned by the faces 54, 54 on the plate. The upright structure is adjusted to a vertical or plumb position, and then the nut 46 is turned to force the screw 36 upward against the fixed upper support 100. The nut is turned to apply sufficient vertical pressure to firmly clamp the upright structure between the lower fixed support, which is the plate 48, and the upper fixed support 100. The upright structure, including the guide line supporting members 10 and 32, is thus held in its correct line supporting position.

The clips 16 and 18 for the lines 12 and 14 are engaged with the member 10 as shown, and the opposite ends of the lines being held by other supporting means, not shown. Fig. 10 shows the lines at the positions for laying the first course of brick.

As successive courses of brick are laid the clips and the guide lines are shifted vertically upward. The member 10 and the sleeve 32 may be marked with a crayon or pencil to indicate the proper positioning of the guide lines for successive courses. When the top of the member 10 is reached, the clips are shifted onto the sleeve 32. When the clips reach positions near the top of the sleeve, the sleeve is raised on the member 24 and the clips are replaced near the bottom of the sleeve and again shifted upward, this procedure being repeated. Fig. 11 shows the brickwork completed up to a level near the top of the sleeve 32 with the sleeve near the top of the member 24. When the sleeve 32 is in or near its uppermost position, but before the brick is laid above the bottom of the sleeve, the plate 80 is put in blace in exact vertical register with the plate 48. The faces 62, 62 on the ribs 60, 60 and the slots 64 assist in properly locating the plate 80. The faces 54, 54 on the plate engage the corresponding faces of the sleeve 32. The inner portion of the plate 80 is in the mortar space between two courses of brick and after the plate has been put in place additional courses of brick are laid up to approximately the level shown in Fig. 11. Thus the plate 80 is firmly held in place.

When the brickwork has been completed to the selected level, as for instance that shown in Fig. 11, the nut 46 is turned to loosen the screw 36. Then the temporary upper support 100 is removed and the upright structure is moved upward so that the member 10 is supported on the plate 80 as shown in Fig. 12. If necessary a plank or other temporary support may be placed beneath the plate 80 to more firmly hold it. The procedure already described is repeated, the upright structure being placed in vertical or plumb position and clamped between the plate 80, which now becomes the lower support, and a new upper support such as 102 is provided. The clips and lines are shifted upward as before-described and additional courses of brick are laid.

The lower plate 48 is knocked out of its position below the lower course of brick and the space is filled with mortar. The plate 48 is then available for insertion in the wall at a position below the second upper support 102, the plate 48 then becoming the upper plate. Later the upright structure can be again shifted upward to be supported by the plate 48, the plate 80 being knocked out and the space filled. This procedure can be repeated as many times as necessary, the upright structure being supported alternately on the plates 48 and 80.

It will be understood that while the apparatus as described is being used at the exterior corner of the wall another similar apparatus may be used at the interior corner. The use of the apparatus at an interior corner is fully described hereinafter.

In the procedure as illustrated in Figs. 10 to 12 temporary or permanent supports such as 100 and 102 are available. Frequently, however, upper supports such as 100 or 102 are not conveniently available, and in such cases an alternative procedure may be followed, utilizing one or more plates 83 and clamps 84 as shown in Fig. 6.

For the alternative procedure a plate 48, or alternatively a plate 83, is put in place as shown in Figs. 10 and 17. Then a corner lead of brick is laid up in accordance with conventional practice. At a suitable level, as for instance at the top of the seventh course, a plate 83 is put in place in the lead. The main portions of the wall up to the level of the top of the lead are laid with the guide lines carried by the lead. Then the upright structure is positioned as shown in Fig. 10, this being supported on the lower plate 48 and being engaged with the plate 83 carried by the wall lead. A clamping member 84 is connected to the last-mentioned plate 83 so as to engage the upright member 10 and thus hold the entire upright structure in proper upright position. All additional courses of brick are laid with the guide lines carried by the upright structure.

At a suitable higher level a second plate 83 is inserted in the wall and the upright structure is clamped by a second member 84. When the guide lines approach the top of the upright structure, the clamping members 84 are released and the upright structure is shifted upward so that the lower portion thereof is supported on the lower plate 83. This procedure may be repeated to whatever extent is necessary.

Figs. 13 and 14 illustrate successive steps in the use of the apparatus shown in Figs. 1 to 4 for supporting the guide lines at an exterior corner of a brick veneer building. The procedure is similar to that described in connection with Figs. 10 to 12. The plate 48 is placed on the foundation 104 as described in connection with Fig. 10, and is held by a temporary support 106 which may be a stake driven in the ground. The temporary upper fixed support may be a plank 108 carried by the wooden structure of the building.

The plate 80 is placed as already described and several courses of brick are laid above the level shown in Fig. 13. Then the temporary upper support 108 is removed and the upright structure is moved upward so as to be supported by the plate 80, as shown in Fig. 14, the screw being engaged with a new upper support 110 which may be a permanent part of the building. Additional courses of brick are then laid.

In some instances it may be desirable to put the plate 48 in place as shown in Fig. 14, even though it will not be used as a support for the upright structure. It serves to resist any possible lateral movement of the upright structure. When the purpose is merely to prevent lateral movement it may be desirable to substitute the plate 83 and the clamping member 84 as shown in Fig. 6.

Fig. 15 shows the arrangement for a building having brick walls and wooden floor structures. It is common practice in solid wall residence construction to build the wooden framework at least one story ahead of the brickwork, carrying the outer ends of the joists on temporary horses until the brickwork has been advanced to the point where the ends of the joists can be bricked in.

The plate 48 is placed on the foundation 112 as described in connection with Figs. 10 and 11. Only the lower and upper portions of the upright structure are shown, the member 10 being supported on the plate 48 and the screw 36 at the top engaging an upper support 114 which is a plank temporarily secured to the floor structure for the second floor. A second upright structure is placed for supporting guide lines for the wall at the interior corner thereof. Only the lower and upper portions of the second upright structure are shown. The member 10 of the second upright structure may be supported directly on the wooden floor 116 and the screw 36 at the top of the second upright structure may engage a part 118 of the wooden floor structure for the second floor.

The procedure at the exterior corner may be that already described in connection with Figs. 10 to 12 and Figs. 13 and 14. The procedure at the interior corner will be fully described in connection with Figs. 25 to 29.

Fig. 16 shows the arrangement for laying a partition wall between two existing floors of a building, this view showing hollow tile instead of brick. The upright member 10 is supported directly on the lower floor 120, and the screw 36 at the top can engage the ceiling at the bottom of the second floor 122.

*Apparatus as shown in Fig. 17*

Fig. 17 illustrates the fact that the upright structure does not necessarily include two telescoping members such as 10 and 24 and a sleeve such as 32.

When there is sufficient space for the member which is supported by the plate 48 to extend below the said plate, a single member 124 may be provided in lieu of the three members 10, 24 and 32. The member 124 has the same size and shape as the member 10, and it carries at the top a screw 126 and a nut 128 similar to the screw 36 and the nut 46. The member 124 has a plurality of pairs of holes 130, 130 for the pin 58. The adjustment for different distances between the plate 48 and the upper support can be made by changing the pin 58 from one pair of holes to another. The apparatus is otherwise similar to that shown in Figs. 1 to 5 and the manner of use is substantially the same.

*Apparatus as shown in Figs. 18 to 20*

Figs. 18 to 20 illustrate the fact that the telescopically engaging members and the sleeve are not necessarily tubular. A lower upright member 132 is provided corresponding in function to the member 10, and an upper upright member 134 is provided corresponding in function to the member 24. The upright members 132 and 134, instead of being tubular are angle-shaped as shown more clearly in Fig. 19. The members 132 and 134 are relatively adjustable vertically and they can be held in adjusted positions by means of pairs of screws 136, 136 which extend through holes in the outer member 132 and into vertically spaced threaded holes 138, 138 in the inner member 134. There is a plurality of pairs of holes 138, 138 and the screws can be entered in different holes.

Extending through holes in the lower portion of the lower member 132 is a pin 139 corresponding in function to the pin 58. The pin 139 is adapted to enter grooves in a lower plate 140 similar to the plate 48. The plate 140 is somewhat wider than the plate 48 in order to accommodate the member 134. There is also provided an upper plate 141 similar to the plate 140.

Secured to the upper end of the upper member 134, by welding or otherwise, is a bracket 142. The bracket 142 has an unthreaded vertical hole therein through which extends a screw 144. A key in the bracket enters a vertical keyway 146 in the screw to prevent the screw from turning. The screw 144 is engaged by a nut 148, the bottom of the nut engaging the top of the bracket. It will be seen that the screw 144 and the nut 148 function in the same manner as the screw 36 and the nut 46.

In lieu of a complete sleeve, such as 32, there is provided an angle-shaped member 150 which engages and partly surrounds the upper upright member 134 and which acts as a sleeve. The sleeve 150 has the same size and shape as the lower upright member 132 and is vertically adjustable along the upper upright member 134. A transverse bar 152 is welded in place to connect the two legs of the angle-shaped sleeve 150 as shown in Figs. 18 and 20. A thumb screw 154 extends through the bar 152 and is engageable at its inner end with the member 134. The thumb screw serves to hold the sleeve 150 in vertically adjusted position.

It will be seen that the apparatus as shown in Figs. 18 to 20 may be used in connection with an interior corner in the same manner as the apparatus shown in Figs. 1 to 4.

*Apparatus as shown in Figs. 21 and 22*

Fig. 21 is similar to Fig. 19 but shows bars 155 and 156 which may be connected with the member 132 by means of screws 157. It will be understood that these bars extend throughout the entire length of the member 132, but terminate above the bottom thereof so as to provide space for the plate 140.

Fig. 22 is similar to Fig. 20, but shows vertical bars 158 and 159 which may be connected with the sleeve 150 by means of screws 160, 160, the bars 158 and 159 being similar to the bars 155 and 156. It will be understood that these bars 158 and 159 extend throughout the entire length of the sleeve. The purpose of the optionally useable bars 155, 156, 158 and 159 will be explained in connection with the use of the apparatus in connection with interior wall corners.

Apparatus as shown in Figs. 23 to 25

The apparatus as shown in Figs. 23 to 25 is or may be exactly the same as the apparatus shown in Figs. 1 to 4 except that a supplemental member or sleeve 160 is provided. The supplemental sleeve 160 is engageable either with the lower upright 10 as shown in Fig. 23 or with the first sleeve 32 as shown in Fig. 24. A thumb screw 162 is provided for securing the supplemental sleeve 160 in adjusted position on the number 10 or on the sleeve 32.

An angle bar 164 is preferably secured to the supplemental sleeve at the inner corner thereof by welding or otherwise, this angle bar extending throughout the entire length of the sleeve. This angle bar provides a vertical corner which is substantially spaced toward the wall from the member 10 and sleeve 32.

In positioning the plate 48 as shown in Fig. 25 the vertical faces 68, 68 on the ribs 60, 60 are or may be placed in engagement with a previously laid portion of the wall or in engagement with a foundation, and the inner edges of the slots 70, 70 and 74, 74 may be placed in alignment with the wall faces at opposite sides of the corner. With the plate 48 so located, it serves to so position the upright member 10 that the corner of the angle bar or projection 164 on the sleeve 160 is closely adjacent but slightly spaced from the corner of the wall as shown.

The outer faces of the projection 164 are relatively narrow so that the line holding clips extend substantially beyond the said projection and can thus be readily engaged manually when the apparatus is in place at the interior corner of a wall as shown in Fig. 25. The line holding clip 16 may be the same as that shown in Figs. 1 and 4, but in lieu of the line holding clip 18 there is provided a line holding clip 82 which has been mentioned in connection with Fig. 5 and which is more clearly shown in Fig. 30.

Referring to Fig. 30, it will be seen that the line holding clip 16 is vertically narrow and that the line holding clip 82 is vertically wide, being bifurcated to straddle the clip 16 so that the two clips may hold the two guide lines 12 and 14 at the same level. Either clip may be raised independently of the other, the clip 16 being shown in dotted lines at a raised position. Clips such as the clips 16 and 82 are not herein specifically claimed, these being set forth and claimed in my copending application for Line Holding Clips for Brick Laying, Serial No. 169,332 filed June 21, 1950, as a continuation-in-part of this present application.

Figs. 31 and 32 show in detail the preferred manner of attaching the lines 12 and 14 to the clips 16 and 82.

Apparatus as shown in Fig. 26

The apparatus as shown in Fig. 26 is similar to that shown in Figs. 8 and 9, but in lieu of the sleeve 89 there is provided a sleeve 166 which is adapted for use at an interior wall corner. The sleeve 166 is generally similar to the sleeve 89, but differs therefrom in that it is formed with recesses 168, 168 which provide a projecting corner portion 170 corresponding in shape and function to the projection 164 shown in Figs. 23 to 25. The plate 48 is located with respect to the wall in the manner already described in connection with Fig. 25.

Use of apparatus for interior wall corner as shown in Figs. 5 and 27

When the apparatus is to be used for holding the guide lines at an interior corner at the inside of a wall, it is frequently possible for the upright structure to be engaged directly with lower and upper floors, such as 172 and 174, forming a part of the building, no plates such as 48 and 80 being necessary.

The members 10 and 24 are relatively adjusted vertically to obtain an over-all length which is slightly less than the distance between the floors 172 and 174. The structure is located so that the faces of the member 10 and the sleeve 32 are adjacent but slightly spaced from the wall faces at opposite sides of the corner. Then the upright structure is clamped in place by means of the screw 36 and the nut 46.

The line holding clips 16 and 82 are first engaged with the member 10 for laying the lowermost course of brick. As successive courses of brick are laid, the clips and guide lines are shifted vertically upward. Inasmuch as the bifurcated clip 82 straddles the clip 16, the two guide lines 12 and 14 can be held at the same level and either of them can be shifted upward independently of the other. When the top of the member 10 is reached the clips are shifted onto the sleeve 32 as shown in Fig. 27. When the clips reach positions near the top of the sleeve, the sleeve is raised on the member 24 and the clips are replaced near the bottom of the sleeve and again shifted upward, this procedure being repeated.

It will be understood that while the apparatus as described is being used at the interior corner of the wall another similar apparatus may be used at the exterior corner. The use of the apparatus at an exterior corner has already been described.

When the apparatus is used as illustrated in Figs. 5 and 27, the bricks at the interior corner are closely adjacent the upright structure and it is therefore impossible to reach with a trowel those portions of the mortar joints which are directly behind the upright structure. The interior faces of the wall immediately adjacent the corner are therefore rough. This is unobjectionable when the wall is to be plastered or otherwise covered. When it is necessary to smoothly finish the mortar joints immediately adjacent the corner, it is preferable to follow the procedure described in connection with Figs. 25, 26, 28 and 29.

Use of apparatus for interior wall corner as shown in Figs. 25, 26, 28 and 29

When it is necessary to smoothly finish the mortar immediately adjacent an interior corner it is preferable to utilize a supplemental sleeve such as 160 as illustrated in Figs. 25, 28 and 29. When the sleeve is used the upright elements 10 and 32 are relatively widely spaced from the wall faces, and sufficient space is provided for the entry of a trowel or other joining tool to smooth the mortar joints. This can be done as soon as the sleeve 160 has been moved upward so as to be out of the way.

The proper wider spacing of the upright structure from the wall face can be obtained in any desired manner, but it is usually more convenient to use the plate 48 for this purpose. This is particularly so when the apparatus is to be used for an interior wall corner at the outside of a building, as in this case there is no lower support, such as the floor 172, for the lower upright member 10. The plate 48 is located with respect to the wall to be laid as described in connection with Fig. 25, and a separate temporary support, not shown, may be provided for the plate as described in connection with Figs. 10 and 13.

The upright structure, after being adjusted as to length, is clamped in place between the plate 48 and a temporary upper support such as 176. The supplemental sleeve 160 is initially located at the bottom of the member 10 closely adjacent the plate 48. The clips 16 and 62 for the guide lines 12 and 14 are engaged with the projection 164 on the supplemental sleeve 160 as shown in Fig. 25 in positions for laying the first course of brick. As successive courses of brick are laid, the clips and the guide lines are shifted vertically upward along the projection 164. By reference to Figs. 25 and 30 it will be seen that the ends of the clips extend beyond the edges of the projection 164 so that they can readily be engaged manually for shifting.

When the clips have been shifted to positions near the top of the projection 164, the sleeve 160 is raised and the clips are moved to new positions near the bottom of the projection 164. This is repeated until the sleeve 160 is engaged with the first sleeve 32. Then when the clips reach the top of the projection 164 both sleeves are moved upward in unison and the clips are moved to new positions near the bottom of the projection 164. This is repeated until positions are reached, such as shown in Fig. 28.

Before the positions shown in Fig. 28 are reached, the plate 80 is inserted in the wall in the manner already described in connection with Fig 11.

After the positions shown in Fig. 28 are reached and after the plate 80 has been inserted, the upright structure is released and the temporary support 176 is removed. Then the upright structure is moved upward to a new position and is clamped between the plate 80 and a new upper support such as 178 as shown in Fig. 29. An additional portion of the wall is then laid following the procedure already described in connection with Fig. 27.

When no upper supports such as 176 and 178 are conveniently available an alternative procedure may be followed at an interior corner which is similar to the alternative procedure at an exterior corner as described in connection with Figs. 10 to 12. For this alternative procedure plates 83 and clamping members 84 are used. The alternative procedure is substantially the same as that already described and repetition is unnecessary.

The apparatus as shown in Figs. 21 and 22 is used substantially as described in connection with Figs. 28 and 29. The apparatus as shown in Fig. 26 is used in substantially the same manner as already described in connection with Figs. 28 and 29.

*Apparatus as shown in Figs. 33 and 34*

The apparatus as shown in Figs. 33 and 34 is or may be exactly the same as the apparatus shown in Figs. 23 to 25 except that the supplemental sleeve 160 is omitted, a different supplemental sleeve 180 being provided which carries lateral arms 182 and 184. This apparatus is particularly adapted for the laying of walls having pilasters, buttresses or the like.

The sleeve 180 is shown as comprising two separate parts which are connected by bolts 186, 186. The sleeve 180 is adapted to engage either the member 10 or the sleeve 32 and it can be clamped in vertically adjusted position on the said member 10 or on the said sleeve 32 by the said bolts 186, 186. The sleeve 180 is of such size that the corners thereof are spaced from the upright member 10 or from the sleeve 32 by the same distance as the corner of the projection 164 shown in Fig. 25.

Line clips such as 188 and 190, similar to the line clips 16 and 18, hold guide lines such as 192 and 194 and the said clips may be engaged with two corners of the sleeve 180 as shown. The line clips 188 and 190 are not vertically adjustable along the sleeve 180 and the line clips are shifted vertically by moving the sleeve upward along the member 10 or along the sleeve 32.

The before-mentioned arms 182 and 184 may be formed integrally with one portion of the sleeve 180, these arms extending horizontally and at right angles to each other. Each of the arms 182 and 184 may be provided with an extension 196 which is held in place by bolts 198, 198. The extensions may be used when relatively long arms are necessary and may be omitted when shorter arms are sufficient. For purposes of description the extensions will be regarded as parts of the arms. Line holding clips such as 200 and 202 may be engaged with the arms, these clips holding guide lines 204 and 206. The top faces of the arms 182 and 184 are horizontal and the clips 200 and 202 can be shifted inward or outward along the top faces of the arms as required. The top faces of the arms 182 and 184 are at such an elevation that the guide lines 204 and 206 are held at the same level as the guide lines 192 and 194. The inner ends of the arms 182 and 184 are notched at 208, 208 to provide space for the clips 188 and 190, or to provide space for the lines 192 and 194.

*Use of apparatus for walls with pilasters as shown in Figs. 35 to 38*

Fig. 35 illustrates the apparatus as shown in Figs. 33 and 34 in place at an exterior corner of a wall having corner pilasters A, A and having other pilasters B, B which are spaced from the pilasters A, A to provide intermediate panels having all faces spaced inward from the outer faces of the pilasters. It will be understood that the apparatus is or may be supported and held in position in the same manner as already explained in connection with Fig. 10.

For supporting guide lines such as 12 and 14 at the interior corner of the wall, there may be provided another apparatus having the construction already described which apparatus is used as described in connection with Fig. 27.

The guide lines 192 and 194 supported on the sleeve 180 serve to guide the laying of the brick at the outer faces of the pilasters and the guide lines 204 and 206 supported on the arms 182 and 184 serve to guide the laying of the brick at the inner faces of the panels between the pilasters.

It will be seen that the clips 200 and 202 can be placed in any suitable positions along the arms in accordance with the width of the pilaster to be laid.

Initially the supplemental sleeve 180 is located at the bottom of the upright member 10 and all four of the lines 192, 194, 204 and 206 are shifted upward in unison by raising the sleeve 180 first along the upright member 10 and then along the sleeve 32. When the top of the sleeve 32 is reached, further upward shifting can be effected by moving the said sleeve 32 upward along the member 24.

Fig. 36 illustrates the apparatus as shown in Figs. 33 and 34 in place at an exterior corner of a wall having pilasters C and D spaced from the corner. As shown, the pilaster D is narrower than the pilaster C. The guide lines 192 and 194 supported on the sleeve 180 serve to guide the laying of the brick at the outer faces of the main corner and the guide lines 204 and 206 supported on the arms 182 and 184 serve to guide the laying of the brick at the outer faces of the pilasters C and D. The width of the pilaster D is such that the arm 182 does not require an extension 196.

Figure 37:
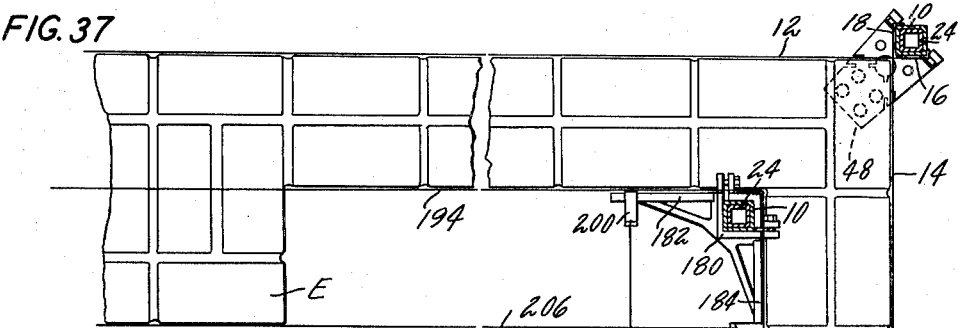

Fig. 37 illustrates the apparatus as shown in Figs. 33 and 34 in place at an interior corner of a wall having interior pilasters E, E spaced from the corner. It will be understood that the apparatus is or may be supported and held in position in the same manner as already explained in connection with Fig. 27.

For supporting guide lines such as 12 and 14 at the exterior corner of the wall, there may be provided another apparatus having the construction already described which apparatus is used as described in connection with Fig. 10.

The guide lines 192 and 194 supported on the sleeve 180 serve to guide the laying of the brick at the faces adjacent the corner and also at the faces between the pilasters. The guide lines 204 and 206 supported on the arms 182 and 184 serve to guide the laying of the brick at the inner faces of the pilasters E, E. It will be seen that the width of the pilasters is such that the extensions 196 are not needed on the arms 182 and 184.

Figure 38:
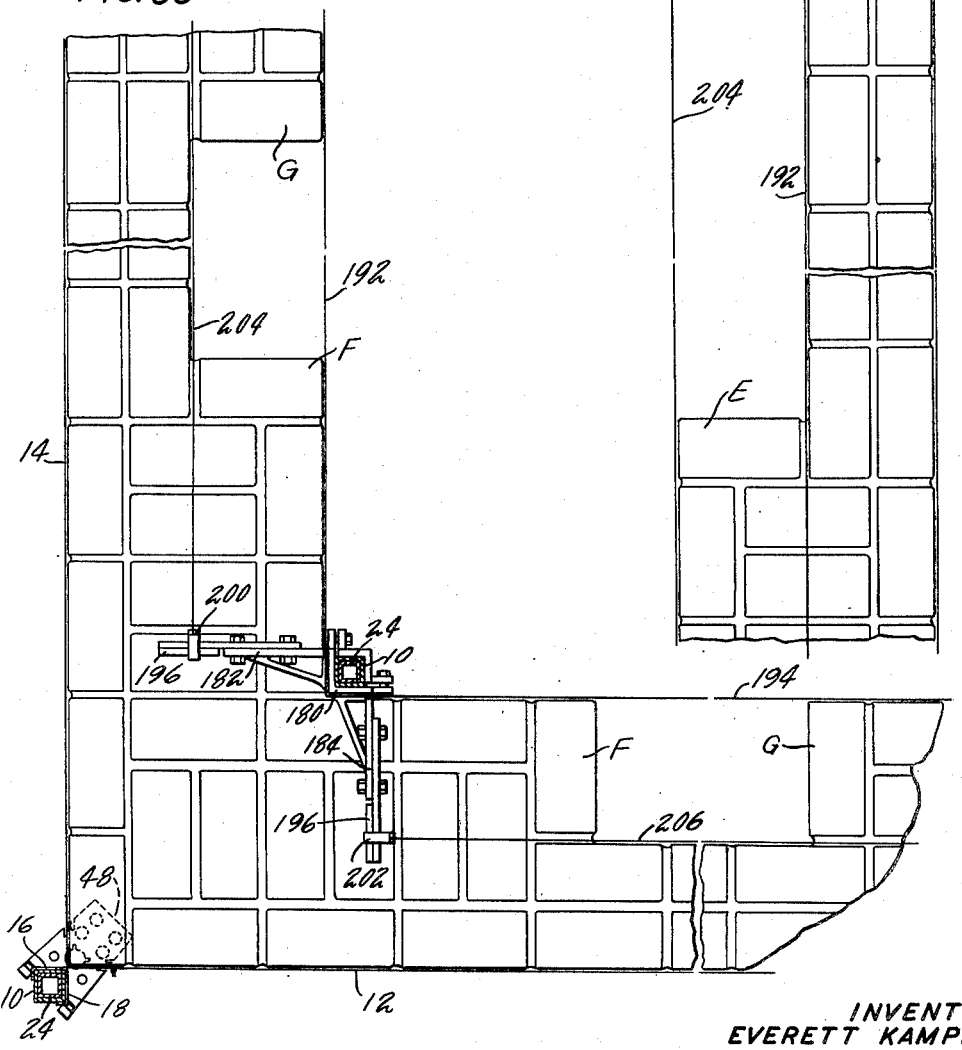

Fig. 38 illustrates the apparatus as shown in Figs. 33 and 34 in place at an interior corner of a wall having interior pilasters F, F at the corner and having other interior pilasters G, G spaced from the pilasters F, F to provide intermediate panels having faces spaced outward from the inner faces of the pilasters. The guide lines 192 and 194 supported on the sleeve 180 serve to guide the laying of the brick at the inner faces of the pilasters F, F and G, G, these lines extending through the notches 208, 208. The guide lines 204 and 206 supported on the arms 182 and 184 serve to guide the laying of the brick at the faces of the panels between the said pilasters.

When the apparatus is in the position shown in Fig. 37 or in the position shown in Fig. 38, certain parts of the apparatus interfere with the laying of some of the bricks in the course guided by the lines 192, 194, 204 and 206. It will be understood that the bricks, as to which there is interference, are temporarily omitted and are laid after the lines are shifted upward for the next course.

Summary

The apparatus as shown in Figs. 1 to 4 may be regarded as representative, the constructions shown in Fig. 6, in Figs. 7 to 9, in Fig. 17 and in Figs. 18 to 20 being variations of that shown in Figs. 1 to 4.

The apparatus comprising only the members 10, 24 and 32, together with the screw 36 and incidental parts, may be used without supporting plates such as 48 and 80, two examples being illustrated in Figs. 16 and 27. The guide lines may be supported on the upright members 10 and 32 in any suitable way as for instance by line clips such as 16 and 18 or 16 and 82.

When a fixed lower support, other than a part of the building, is necessary, the plate 48 is utilized as illustrated in Figs. 10 and 11, in Fig. 13, in Fig. 15 and in Fig. 28. The plate serves not only to support the upright structure but also to position it in proper relationship with the corner of the wall.

When the height of the wall is greater than the length of the upright structure, two supporting plates 48 and 80 may be used, the upright structure being shifted upwardy from one to the other as illustrated in Fig. 12, in Fig. 14 and in Fig. 29.

For an interior corner, particularly when it is necessary to provide space for smoothing the mortar joints adjacent the corner, the supplemental sleeve 160 is utilized, as illustrated in Figs. 23 to 25 and in Figs. 28 and 29.

When the wall to be laid includes pilasters or the like, the alternative supplemental sleeve 180 is provided having the arms 182 and 184, as shown in Figs. 33 and 34 and in Figs. 35 to 38.

From the foregoing it is clear that there is provided a single basic apparatus, together with optionally useable parts such as the plates 48 and 80 and the sleeves 160 and 180. This basic apparatus with the optionally added parts provides for the laying of brick or other masonry units under a wide variety of circumstances. In all instances the apparatus avoids the necessity for the built-up corner leads which have heretofore been conventional.

The drawings show and the specification describes various embodiments of the invention for use at right-angled exterior and interior corners of masonry walls. It will be understood, however, that with minor changes in structure or in procedure, apparatus embodying the invention may be used at corners having acute angles and obtuse angles.

What is claimed is:

1. In a guide line supporting apparatus for use in laying a wall of brick or the like, the combination of a member adapted to be located in upright position adjacent a corner of the wall to be laid and serving to support horizontal guide lines for the laying of the brick which lines can be shifted vertically upward for successive courses, a horizontal supporting plate for the said upright member having a portion of such thickness that it can be located between two immediately adjacent courses of the brick in the wall and also having a portion adapted to project horizontally beyond the wall, the last said portion being provided with a notch which extends vertically therethrough and is open in the direction away from the first said portion so as to receive the said upright member, and means for connecting the lower portion of the upright member with the projecting portion of the plate for preventing downward movement of the upright member relative to the plate.

2. In a guide line supporting apparatus for use in laying a wall of brick or the like, the combination of a member adapted to be located in upright position adjacent a corner of the wall to be laid and serving to support horizontal guide lines for the laying of the brick which lines can be shifted vertically upward for successive courses, a horizontal supporting plate for the said upright member having a portion of such thickness that it can be located between two immediately adjacent courses of the brick in the wall and also having a portion adapted to project horizontally beyond the wall, the last said portion being provided with a notch which extends vertically therethrough and is open in the direction away from the first said portion so as to receive the said upright member which notch has vertical faces for positioning the upright member in predetermined relationship to the wall and the said projecting portion of the plate being provided at its upper face with two aligned horizontal grooves at opposite sides of the notch, and a transverse horizontal bar connected with the lower portion of the upright member which bar is engageable with the grooves in the projecting portion of the supporting plate for preventing relative downward movement of the upright member relative to the plate.

3. In a guide line supporting apparatus for use in laying a wall of brick or the like, the combination of a member adapted to be located in upright position adjacent a corner of the wall to be laid and serving to support horizontal guide lines for the laying of the brick which lines can be shifted vertically upward for successive courses, a horizontal supporting plate for the said upright member having a portion of such thickness that it can be located between two immediately adjacent courses of the brick in the wall and also having a portion adapted to project horizontally beyond the wall, the last said portion being provided with a notch which extends vertically therethrough and is open in the direction away from the first said portion so as to receive the said upright member which notch is provided with two vertical faces at right angles to each other and adapted to be positioned in predetermined parallel relationship with the respective faces of the wall at opposite sides of a corner thereof, the said faces of the notch engaging the upright member to position it with its sides in the said predetermined parallel relationship with the last said faces of the wall, and means for connecting the lower portion of the upright member with the projecting portion of the supporting plate for preventing relative downward movement of the upright member relative to the plate.

4. In a guide line supporting apparatus for use in laying a wall of brick or the like, the combination of a member adapted to be located in upright position adjacent a corner of the wall to be laid and serving to support horizontal guide lines for the laying of the brick which lines can be shifted vertically upward for successive courses, a horizontal supporting plate for the said upright member having a portion of such thickness that it can be located between two immediately adjacent courses of the brick in the wall and also having a portion adapted to project horizontally beyond the wall, the last said portion being provided with a notch which extends vertically therethrough and is open in the direction away from the first said portion so as to receive the said upright member which notch is provided with two vertical faces at right angles to each other which faces of the notch engage the upright member to position it and the said projecting portion of the plate being formed with ribs at the bottom having vertical faces engageable with the respective faces of the wall at opposite sides of a corner thereof to position the plate with the said notch faces in the predetermined parallel relationship with the said wall faces, and means for connecting the lower portion of the upright member with the projecting portion of the supporting plate for preventing relative downward movement of the upright member relative to the plate.

5. A supporting plate adapted to serve as a part of a guide line supporting apparatus for use in laying a wall of brick or the like, the said plate having a portion of such thickness that it can be located between two immediately adjacent courses of the brick in the wall and the said plate having a projecting portion with a notch therein which extends vertically therethrough and is provided with two vertical faces at right angles to each other and the said projecting portion of the plate being formed with ribs at the bottom thereof having vertical faces engageable with the respective faces of a wall at opposite sides of an exterior corner thereof to position the plate with the said notch faces substantially in alignment with the respective wall faces.

6. A supporting plate adapted to serve as a part of a guide line supporting apparatus for use in laying a wall of brick or the like, the said plate having a portion of such thickness that it can be located between two immediately adjacent courses of the brick in the wall and the said plate having a projecting portion with a notch therein provided with two vertical faces at right angles to each other and the said projecting portion of the plate being formed with ribs at the bottom thereof having vertical faces engageable with the respective faces of a wall at opposite sides of an interior corner thereof to position the plate with the said notch faces in predetermined spaced relationship with the respective wall faces.

7. A supporting plate adapted to serve as a part of a guide line supporting apparatus for use in laying a wall of brick or the like, the said plate having a portion of such thickness that it can be located beween two immediately adjacent courses of the brick in the wall and the said plate having a projecting portion with a notch therein provided with two vertical faces at right angles to each other and the said projecting portion of the plate being formed with ribs at the bottom thereof which ribs have vertical faces engageable with the respective faces of a wall at opposite sides of an exterior corner thereof to position the plate with the said notch faces substantially in alignment with the respective wall faces and which ribs have other vertical faces engageable with the faces of a wall at opposite sides of an interior corner thereof to position the plate with the said notch faces in predetermined spaced relationship with the respective wall faces.

8. In a guide line supporting apparatus for use in laying a wall of brick or the like, the combination of a member adapted to be located in upright position adjacent a corner of the wall to be laid and serving to support horizontal guide lines for the laying of brick which lines can be shifted vertically upward for successive courses, a horizontal supporting plate for the said upright member having a portion of such thickness that it can be located between two immediately adjacent courses of the brick in the wall, the said plate having a projecting portion with a notch therein provided with two vertical faces at right angles to each other which faces of the notch engage the upright member to position it and the said plate being provided with markings separate from the said notch therein and located for alignment with the faces of the wall at opposite sides of a corner thereof to position the plate with the said notch faces in predetermined parallel relationship with the said faces of the wall, and means for connecting the lower portion of the upright member with the projecting portion of the supporting plate for preventing relative downward movement of the upright member relative to the plate.

9. A supporting plate adapted to serve as a part of a guide line supporting apparatus for use in laying a wall of brick or the like, the said plate having a portion of such thickness that it can be located between two immediately adjacent courses of the brick in the wall and the said plate having a projecting portion with a notch therein provided with two vertical faces at right angles to each other and the said plate being provided with markings separate of the said notch therein and located for registry with the respective faces of the wall at opposite sides of an exterior corner thereof to position the plate with the said notch faces substantially in alignment with the said wall faces.

10. A supporting plate adapted to serve as a part of a guide line supporting apparatus for use in laying a wall of brick or the like, the said plate having a portion of such thickness that it can be located between two immediately adjacent courses of the brick in the wall and the said plate having a projecting portion with a notch therein provided with two vertical faces at right angles to each other and the said plate being provided with markings separate of the said notch therein and located for alignment with the respective faces of the wall at opposite sides of an interior corner thereof to position the plate with the said notch faces in spaced parallel relationship with the said wall faces.

11. A supporting plate adapted to serve as a part of a guide line supporting apparatus for use in laying a wall of brick or the like, the said plate having a portion of such thickness that it can be located between two immediately adjacent courses of the brick in the wall and the said plate having a projecting portion with a notch therein provided with two vertical faces at right angles to each other and the said plate being provided with markings separate of the said notch therein and located for registry with the respective faces of the wall at opposite sides of an exterior corner thereof to position the plate with the said notch faces substantially in alignment with the said wall faces and the said plate being also provided with other markings located for alignment with the respective faces of the wall at opposite sides of an interior corner thereof to position the plate with the said notch faces in spaced parallel relationship with the said wall faces.

12. In a guide line supporting apparatus for use in laying a wall of brick or the like, the combination of a structure adapted to be located in upright position adjacent a corner of the wall to be laid and serving to support horizontal guide lines for the laying of the brick which lines can be shifted vertically upward for successive courses, two similar superposed lower and upper horizontal supporting plates for the said upright structure each having a portion of such thickness that it can be located between two immediately adjacent courses of the brick in the wall and each having a projecting portion shaped to permit the upright structure to extend past it when the said structure is in its said upright position, and means for connecting the lower portion of the upright structure with the projecting portion of the lower plate for preventing relative downward movement of the upright structure relative to the lower plate and for thereafter connecting the said lower portion of the upright structure with the projecting portion of the upper plate for preventing relative downward movement of the upright structure relative to the upper plate.

13. In a guide line supporting apparatus for use in laying a wall of brick or the like, the combination of a structure adapted to be located in upright position adjacent a corner of the wall to be laid and serving to support horizontal guide lines for the laying of the brick which lines can be shifted vertically upward for successive courses, two similar superposed lower and upper horizontal supporting plates for the said upright structure each having a portion of such thickness that it can be located between two immediately adjacent courses of the brick in the wall and each having a projecting portion shaped to permit the upright structure to extend past it when the said structure is in its said upright position, means for connecting the lower portion of the upright structure with the projecting portion of the lower plate for preventing relative downward movement of the upright structure relative to the lower plate and for thereafter connecting the said lower portion of the upright structure with the projecting portion of the upper plate for preventing relative downward movement of the upright structure relative to the upper plate, and means for applying vertical pressure to clamp the said upright structure in fixed position between either plate and an upper fixed support.

14. In a guide line supporting apparatus for use in laying a wall of brick or the like, the combination of a structure adapted to be located in upright position adjacent a corner of the wall to be laid and serving to support horizontal guide lines for the laying of the brick which lines can be shifted vertically upward for successive courses, two similar superposed lower and upper horizontal supporting plates for the said upright structure each having a portion of such thickness that it can be located between two immediately adjacent courses of the brick in the wall, each said plate having a projecting portion provided with vertical faces for holding the upright structure in predetermined relationship to the corner of the wall, and means for connecting the lower portion of the upright structure with the projecting portion of the lower plate for preventing relative downward movement of the upright structure relative to the lower plate and for thereafter connecting the said lower portion of the upright structure with the projecting portion of the upper plate for preventing relative downward movement of the upright structure relative to the upper plate.

15. A guide line supporting apparatus for use in laying a wall of brick or the like comprising in combination, two telescopically engaging outer and inner members adapted to be located in upright position adjacent a corner of the wall to be laid with each member extending at one end vertically beyond the corresponding end of the other member, means for connecting the said members with each other in any one of a plurality of positions of relative vertical adjustment, and a vertically extending sleeve engaging the inner member and vertically movable thereon and having the same exterior size and shape as the outer member.

16. A guide line supporting apparatus for use in laying a wall of brick or the like comprising in combination, two telescopically engaging outer and inner members adapted to be located in upright position adjacent a corner of the wall to be laid with each member extending at one end vertically beyond the corresponding end of the other member, means for connecting the said members with each other in any one of a plurality of positions of relative vertical adjustment, a vertically extending sleeve engaging the inner member and vertically movable thereon and having the same exterior size and shape as the outer member, and line holding clips supported by the said outer member or by the said sleeve and adapted to hold horizontal guide lines for the laying of the brick which clips can be shifted vertically along the said outer member and along the said sleeve for successive courses.

17. A guide line supporting apparatus for use in laying a wall of brick or the like comprising in combination, two telescopically engaging outer and inner members adapted to be located in upright position adjacent a corner of the wall to be laid with each member extending at one end vertically beyond the corresponding end of the other member, means for connecting the said members with each other in any one of a plurality of positions of relative vertical adjustment, a vertically extending sleeve engaging the inner member and vertically movable thereon and having the same exterior size and shape as the outer member, the said outer member and said sleeve serving to support horizontal guide lines for the laying of the brick which lines can be shifted vertically along the said outer member and along the said sleeve for successive courses, and means for applying vertical pressure to the said members to clamp them in fixed position between a lower fixed support and an upper fixed support.

18. A guide line supporting apparatus for use in laying a wall of brick or the like comprising in combination, two telescopically engaging outer and inner members adapted to be located in upright position adjacent a corner of the wall to be laid with each member extending at one end vertically beyond the corresponding end of the other member, means for connecting the said members with each other in any one of a plurality of positions of relative vertical adjustment, a vertically extending sleeve engaging the inner member and vertically movable thereon and having the same exterior size and shape as the outer member, the said outer member and said sleeve serving to support horizontal guide lines for the laying of the brick which lines can be shifted vertically along the said outer member and along the said sleeve for successive courses, two similar superposed lower and upper horizontal supporting plates for the members and sleeve each of which plates has a portion of such thickness that it can be located between two immediately adjacent courses of the brick in the wall, each said plate having a projecting portion provided with vertical faces engageable with the outer member or the sleeve for holding the said members and sleeve in predetermined relationship to the corner of the wall, and means for connecting the lower portion of the lower member with the projecting portion of the lower plate for preventing relative downward movement of the members and sleeve relative to the lower plate and for thereafter connecting the said lower portion of the lower member with the projecting portion of the upper plate for preventing relative downward movement of the members and sleeve relative to the upper plate.

19. The combination in a guide line supporting apparatus for use in laying a wall of brick or the like, of a member adapted to be located in upright position adjacent a corner of the wall to be laid, a vertically extending sleeve engaging the said member and vertically movable thereon, the said sleeve having vertical faces at right angles to each other, and two L-shaped line clips engaging the sleeve at the said vertical faces thereof for holding horizontal guide lines for the laying of the brick at opposite sides of the wall corner in spaced relationship with the upright member which clips can be shifted vertically along the said faces of the sleeve for successive courses.

20. The combination in a guide line supporting apparatus for use in laying a wall of brick or the like, of a member adapted to be located in upright position adjacent an interior corner of the wall to be laid, a vertically extending sleeve engaging the said member and vertically movable thereon, the said sleeve having a vertical corner with faces at right angles to each other which faces are adapted to be located close to the wall faces at opposite sides of the interior wall corner and in parallelism with the said wall faces, and two L-shaped line clips engaging the faces at the said corner of the sleeve and serving to hold horizontal guide lines for the laying of the brick at the said faces of the wall in spaced relationship with the upright member which clips can be shifted vertically along the said corner of the sleeve for successive courses.

21. The combination in a guide line supporting apparatus for use in laying a wall of brick or the like, of a member having a main portion adapted to be located in upright position adjacent but spaced from an interior corner of the wall to be laid, the said member having a projection providing a vertical corner with two faces at right angles to each other which faces are spaced from the main portion of the member and are substantially narrower than the total width of the said main portion and are adapted to be located close to the wall faces at opposite sides of the interior wall corner and in parallelism with the said wall faces, and two L-shaped line clips engaging the faces at the said corner of the upright member and serving to hold horizontal guide lines for the laying of the brick at the said faces of the wall in spaced relationship with the said main portion of the upright member which clips can be shifted vertically along the said corner of the member for successive courses.

22. The combination in a guide line supporting apparatus for use in laying a wall of brick or the like, of a member having a main portion adapted to be located in upright position adjacent but spaced from an interior corner of the wall to be laid, the said member having a projection providing a vertical corner and having two narrow faces at right angles to each other which faces are spaced from the main portion of the member and are adapted to be located close to the wall faces at opposite sides of the interior wall corner and in parallelism with the said wall faces, and two L-shaped line clips engaging the faces at the said corner of the projection on the member and serving to hold horizontal guide lines for the laying of the brick at the said faces of the wall in spaced relationship with the said main portion of the upright member which clips can be shifted vertically along the said corner of the projection on the member for successive courses, the said line clips having lengths substantially greater than the widths of the said faces on the projection so that they can be manually engaged and moved when the faces on the projection are closely adjacent the faces of the wall.

23. The combination in a guide line supporting apparatus for use in laying a wall of brick or the like, of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, and a supplemental sleeve engageable with either the outer upright member or the first said sleeve which supplemental sleeve is vertically movable along the said outer member or along the first said sleeve and from one to the other, the said supplemental sleeve being adapted for supporting horizontal guide lines for the laying of brick in spaced relationship with the outer upright member and with the first said sleeve which guide lines can be shifted vertically for successive courses.

24. The combination in a guide line supporting apparatus for use in laying a wall of brick or the like, of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, a supplemental sleeve engageable with either the outer upright member or the first said sleeve which supplemental sleeve is vertically movable along the said outer member or along the first said sleeve and from one to the other, the said supplemental sleeve being adapted for supporting horizontal guide lines for the laying of brick in spaced relationship with the outer upright member and with the first said sleeve which guide lines can be shifted vertically for successive courses, and means for applying vertical pressure to the said members to clamp them in fixed position between a lower fixed support and an upper fixed support.

25. The combination in a guide line supporting apparatus for use in laying a wall of brick or the like, of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, a supplemental sleeve engageable with either the outer upright member or the first said sleeve which supplemental sleeve is vertically movable along the said outer member or the first said sleeve and from one to the other, the said supplemental sleeve being adapted to support horizontal guide lines for the laying of the brick, two similar superposed lower and upper horizontal supporting plates for the members and sleeves each of which plates has a portion of such thickness that it can be located between two immediately adjacent courses of the brick in the wall, each said plate having a projecting portion provided with vertical faces engaging the outer member or the first said sleeve below the supplemental sleeve for holding the said members and sleeves in predetermined relationship to the corner of the wall, and means for connecting the lower portion of the lower member with the projecting portion of the lower plate for preventing relative downward movement of the members and sleeves relative to the lower plate and for thereafter connecting the said lower portion of the lower member with the projecting portion of the upper plate for preventing relative downward movement of the members and sleeves relative to the upper plate.

26. The combination in a guide line supporting apparatus for use in laying a wall of brick or the like, of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, and a vertically extending supplemental sleeve engageable with either the outer upright member or the first said sleeve which supplemental sleeve is vertically movable along the said outer member or along the first said sleeve and from one to the other, the said supplemental sleeve having a vertical corner for engaging and supporting clips for holding horizontal guide lines for the laying of brick in spaced relationship with the outer upright member and with the first said sleeve which clips can be shifted vertically along the said corner for successive courses.

27. The combination in a guide line supporting apparatus for use in laying a wall of brick or the like, of two telescopically engaging outer and inner members adapted to be located in upright position adjacent an interior corner of the wall to be laid, means for connecting the said members with each other in any one of a plurality of positions of relative vertical adjustment, a vertically extending sleeve engaging the inner member and vertically movable thereon and having the same exterior size and shape as the outer member, a plate having a portion of such thickness that its can be located between two immediately adjacent courses of brick in the wall and also having a projecting portion provided with vertical faces engaging the said outer member or the said sleeve, the said plate having means thereon for so locating the plate with respect to the said interior corner of the wall that the said vertical plate faces position the outer member and the sleeve at a predetermined spacing from the wall faces at opposite sides of the said interior corner, and a vertically extending supplemental sleeve engageable with either the outer upright member or the first said sleeve which supplemental sleeve is vertically movable along the said outer member or along the first said sleeve and from one to the other, the said supplemental sleeve having a vertical corner with faces at right angles to each other and spaced inward toward the wall faces at the said corner of the wall which corner of the supplemental sleeve serves to engage and support vertically shiftable clips for holding horizontal guide lines for the laying of brick.

28. In a guide line supporting apparatus for use in laying a wall of brick or the like, the combination of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, a supplemental sleeve engageable with either the outer upright member or the first said sleeve which supplemental sleeve is vertically movable along the said outer member or along the first said sleeve and from one to the other, and horizontal arms carried by the supplemental sleeve and located at right angles to each other, the said arms being adapted for supporting horizontal guide lines for the laying of brick at wall faces at right angles to each other and in spaced relationship with the said outer upright member and the first said sleeve.

29. In a guide line supporting apparatus for use in laying a wall of brick or the like, the combination of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, and a supplemental sleeve engageable with either the outer upright member or the first said sleeve which supplemental sleeve is vertically movable along the said outer member or along the first said sleeve and from one to the other, and horizontal arms carried by the said supplemental sleeve and located at right angles to each other, the said arms having horizontal top faces for engagement with clips adjustable along the said faces and adapted for holding horizontal guide lines for the laying of brick at wall faces at right angles to each other and in spaced relationship with the said telescopically engaging members.

30. In a guide line supporting apparatus for use in laying a wall of brick or the like, the combination of two telescopically engaging outer and inner members adapted to be located in upright position adjacent a corner of the wall to be laid, means for connecting the said members with each other in any one of a plurality of positions of relative vertical adjustment, a vertically extending sleeve engaging the inner member and vertically movable thereon and having the same exterior size and shape as the outer member, and a supplemental sleeve engageable with either the outer upright member or the first said sleeve which supplemental sleeve is vertically movable along the said outer member or along the first said sleeve and from one to the other, the said supplemental sleeve having vertical corners for engagement with clips adapted for holding horizontal lines for the laying of brick at wall faces at right angles to each other, and horizontal arms carried by the said supplemental sleeve and located at right angles to each other, the said arms being adapted for supporting horizontal guide lines for the laying of brick at wall faces at right angles to each other and spaced from the first said wall faces.

EVERETT KAMPEL.

REFERENCES CITED

The following references are of record in the file of this patent:

UNITED STATES PATENTS

| Number | Name | Date |
|---|---|---|
| 458,464 | Kelley | Aug. 25, 1891 |
| 713,789 | Newman | Nov. 18, 1902 |
| 1,004,194 | Platt | Sept. 26, 1911 |
| 1,063,473 | Skoog | June 3, 1913 |
| 1,336,004 | Victoria | Apr. 6, 1920 |
| 1,643,880 | Elder | Sept. 27, 1927 |
| 1,643,915 | Angelilli | Sept. 27, 1927 |
| 1,644,456 | Winter | Oct. 4, 1927 |
| 1,872,860 | Winter | Aug. 23, 1932 |
| 1,878,448 | Cornuella | Sept. 20, 1932 |
| 2,291,170 | Moths | July 28, 1942 |
| 2,419,145 | Kersenbrock et al. | Apr. 15, 1947 |
| 2,532,168 | Jakoubek | Nov. 28, 1950 |

FOREIGN PATENTS

| Number | Country | Date |
|---|---|---|
| 118,923 | Great Britain | Sept. 19, 1918 |